(12) United States Patent
Kajiyama et al.

(10) Patent No.: US 8,488,097 B2
(45) Date of Patent: Jul. 16, 2013

(54) METHOD OF AND APPARATUS FOR PRODUCING LIQUID CRYSTAL DISPLAY DEVICE

(75) Inventors: Koichi Kajiyama, Yokohama (JP);
Michinobu Mizumura, Yokohama (JP);
Kazushige Hashimoto, Yokohama (JP)

(73) Assignee: V Technology Co., Ltd., Kanagawa (JP)

( * ) Notice: Subject to any disclaimer, the term of this patent is extended or adjusted under 35 U.S.C. 154(b) by 144 days.

(21) Appl. No.: 12/899,652

(22) Filed: Oct. 7, 2010

(65) Prior Publication Data

US 2011/0085126 A1    Apr. 14, 2011

Related U.S. Application Data

(63) Continuation of application No. PCT/JP2009/056891, filed on Apr. 2, 2009.

(30) Foreign Application Priority Data

| Apr. 8, 2008 | (JP) | 2008-100089 |
| Jun. 5, 2008 | (JP) | 2008-147947 |
| Sep. 29, 2008 | (JP) | 2008-249682 |
| Oct. 2, 2008 | (JP) | 2008-257006 |
| Nov. 17, 2008 | (JP) | 2008-292999 |

(51) Int. Cl.
*G02F 1/1337* (2006.01)

(52) U.S. Cl.
USPC ............................................. 349/191

(58) Field of Classification Search
USPC .................. 349/191, 61, 179, 5, 8, 72, 76
See application file for complete search history.

(56) References Cited

U.S. PATENT DOCUMENTS 5,269,964 A * 12/1993 Yamashita et al. ....... 252/299.61
5,767,924 A * 6/1998 Hiroki et al. .................. 349/5
(Continued)

FOREIGN PATENT DOCUMENTS

| CN | 1564962 A | 1/2005 |
| JP | 2000-241785 | 9/2000 |

(Continued)

OTHER PUBLICATIONS

International Search Report from the Japanese Patent Office for International Application No. PCT/JP2009/056891 (Mail date May 19, 2009).
English language translation of the International Preliminary Report on Patentability from the International Bureau for International Application No. PCT/JP2009/056891 (Nov. 30, 2010).

(Continued)

*Primary Examiner* — Thoi Duong
(74) *Attorney, Agent, or Firm* — Finnegan, Henderson, Farabow, Garrett & Dunner, LLP

(57) ABSTRACT

One aspect of the invention provides a liquid crystal display device producing method for irradiating a liquid crystal display substrate, in which plural pixels are formed in a matrix state and liquid crystal is sealed between a TFT substrate and a counter electrode substrate, with light having a predetermined wavelength to orient liquid crystal molecules toward a predetermined direction in a state in which an electric field is applied to each pixel of the liquid crystal display substrate. The method includes the steps of: dipping the liquid crystal display substrate and a lamp in a transparent liquid having resistivity of a predetermined value or more and sufficiently high transmittance to the light in a state in which the liquid crystal display substrate and the lamp face each other; and lighting the lamp to irradiate the liquid crystal display substrate with the light having a predetermined light quantity in a state in which the electric field is applied to each pixel.

33 Claims, 27 Drawing Sheets

U.S. PATENT DOCUMENTS

2003/0095229 A1    5/2003    Inoue et al.
2003/0151703 A1    8/2003    Nakanishi et al.

FOREIGN PATENT DOCUMENTS

| | | |
|---|---|---|
| JP | 2003-177408 | 6/2003 |
| JP | 2003-228050 | 8/2003 |
| JP | 2008-116672 | 5/2008 |
| KR | 10-2003-0028699 | 4/2003 |
| WO | WO-03/032067 A1 | 4/2003 |

OTHER PUBLICATIONS

Japanese Patent Office Communication dated Jul. 3, 2012 in Japanese Application No. 2008-147947, 3 pages.

Japanese Patent Office Communication dated Jul. 3, 2012 in Japanese Application No. 2008-257006, 2 pages.

* cited by examiner

FIG. 12A  CHARGE 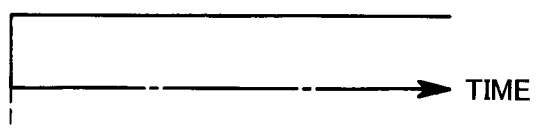
FIG. 12B  SIMMER TRIGGER 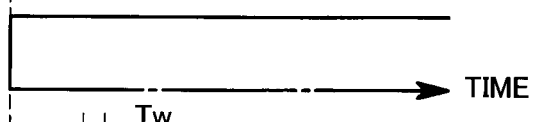
FIG. 12C  A FLASH PULSE 
FIG. 12D  B FLASH PULSE 
FIG. 12E  C FLASH PULSE 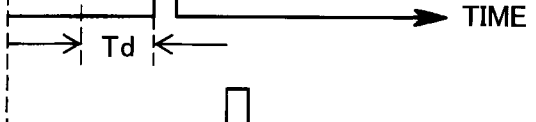
FIG. 12F  D FLASH PULSE 

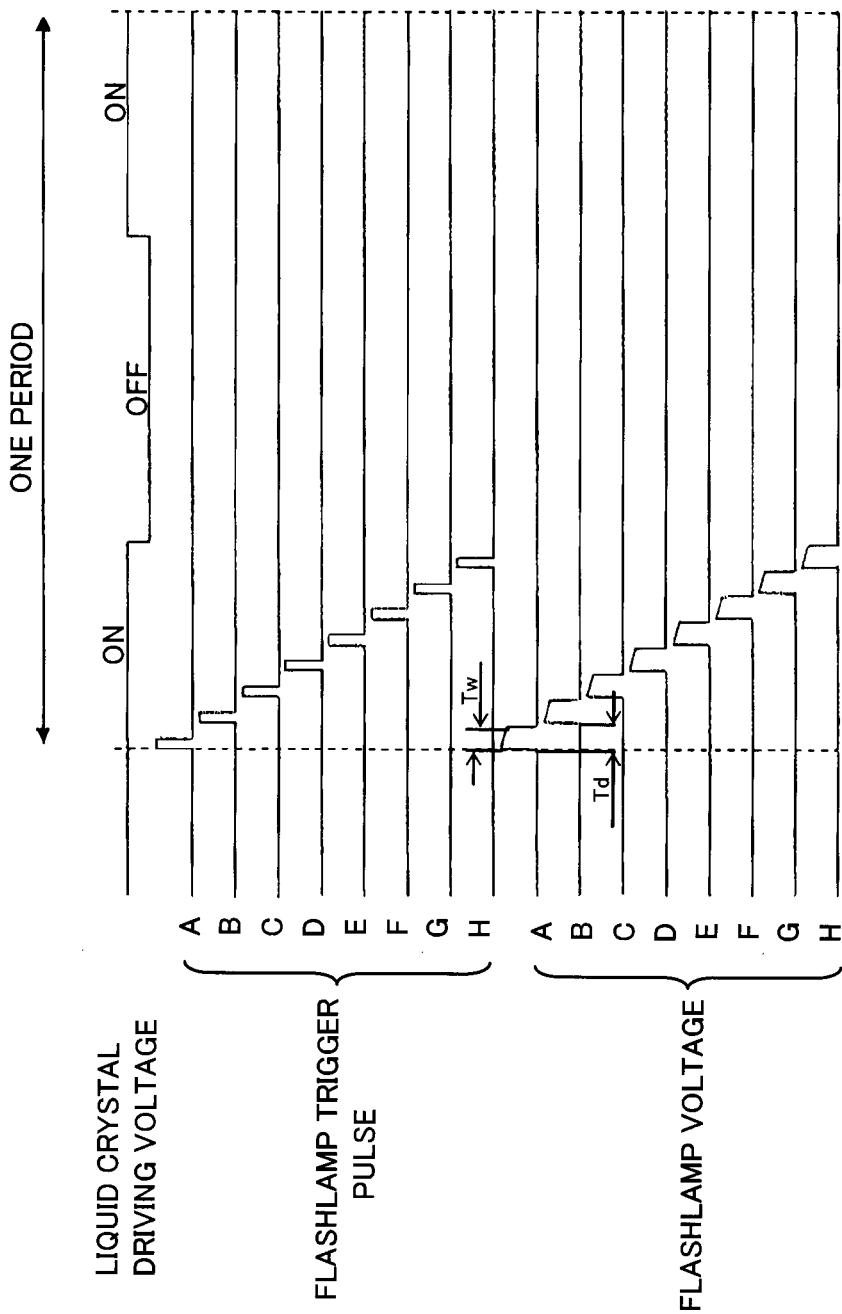

METHOD OF AND APPARATUS FOR PRODUCING LIQUID CRYSTAL DISPLAY DEVICE

This application is a continuation of PCT/JP2009/056891, filed on Apr. 2, 2009.

BACKGROUND OF THE INVENTION

1. Field of the Invention

The present invention relates to a liquid crystal display device producing method for irradiating a liquid crystal display substrate, in which the liquid crystal is sealed, with ultraviolet light to orient liquid crystal molecules toward a predetermined direction while an electric field is applied to the liquid crystal display substrate, and in particular, to liquid crystal display device producing method and apparatus in which production efficiency of the liquid crystal display device is improved while liquid crystal molecular orientation is stabilized in a manner such that the liquid crystal is prevented from absorbing the ultraviolet light to be heated to high temperature.

2. Description of the Related Art

Conventionally, in this kind of liquid crystal display device producing method, a liquid crystal material in which monomers are mixed in the liquid crystal is sealed between a pair of substrates, the liquid crystal material is irradiated with the ultraviolet light while a voltage is applied between the substrates to tilt the liquid crystal molecules, the monomers are polymerized to define an orientation direction of the liquid crystal molecules (for example, see Japanese Laid-open (Kokai) Patent Application Publication No. 2003-228050).

One of the features of the liquid crystal display device producing method is that generation of a defect can be suppressed because the liquid crystal molecules can be oriented in a noncontact manner compared with a method for performing a rubbing treatment to the oriented film to orient the liquid crystal molecules toward a predetermined direction.

SUMMARY OF THE INVENTION

However, in the conventional liquid crystal display device producing method, occasionally, the liquid crystal may absorb the ultraviolet light to be heated to 80° C. or more, and the liquid crystal loses a switching function of transmitting and shutting off the light, which possibly results in a problem in that an image may not appropriately be displayed.

The problem with the heat generation of the liquid crystal can be dealt with in a manner such that the ultraviolet light irradiation is time-shared and performed at constant time intervals. However, in this case, unfortunately the production efficiency of the liquid crystal display device is decreased.

Therefore, taking the above-described existing problems into consideration, an object of the invention is to provide a liquid crystal display device producing method and apparatus in which the production efficiency of the liquid crystal display device is improved while the liquid crystal molecular orientation is stabilized in a manner such that the liquid crystal is prevented from absorbing the ultraviolet light to be heated to high temperature.

In accordance with a first aspect of the invention, a liquid crystal display device producing method for irradiating a liquid crystal display substrate, in which plural pixels are formed in a matrix state and liquid crystal is sealed between a TFT substrate and a counter electrode substrate, with light having a predetermined wavelength to orient molecules of the liquid crystal toward a predetermined direction in a state in which a predetermined electric field is applied to each of the pixels of the liquid crystal display substrate, the method includes the steps of: dipping the liquid crystal display substrate and a lamp in a transparent liquid having resistivity of a predetermined value or more and sufficiently high transmittance to the light in a state in which the liquid crystal display substrate and the lamp face each other; and lighting the lamp to irradiate the liquid crystal display substrate with the light having a predetermined light quantity in a state in which the predetermined electric field is applied to each of the pixels.

In the configuration of the first aspect of the invention, the liquid crystal display substrate in which the pixels are formed in the matrix state and liquid crystal is sealed between the TFT substrate and the counter electrode substrate and the lamp that emits the light having the predetermined wavelength are dipped in the transparent liquid having the resistivity of the predetermined value or more and the sufficiently high transmittance to the light while facing each other, and the lamp is lighted to irradiate the liquid crystal display substrate with the light having the predetermined light quantity while the predetermined electric field is applied to each pixel, thereby orienting the liquid crystal molecules toward a predetermined direction.

In the liquid crystal display device producing method according to the first aspect of the invention, preferably the liquid is pure water. Therefore, the transparent liquid having the resistivity of a predetermined value or more and the sufficiently high transmittance to the ultraviolet light can easily be obtained.

In accordance with a second aspect of the invention, a liquid crystal display device producing method for irradiating a liquid crystal display substrate, in which plural pixels are formed in a matrix state and liquid crystal is sealed between a TFT substrate and a counter electrode substrate, with light having a predetermined wavelength to orient molecules of the liquid crystal toward a predetermined direction in a state in which a predetermined electric field is applied to each of the pixels of the liquid crystal display substrate, the method includes the steps of: bringing one surface of the liquid crystal display substrate into contact with a cooling medium; and irradiating the liquid crystal display substrate with the light having a predetermined light quantity in a state in which the predetermined electric field is applied to each of the pixels.

In the configuration of the second aspect of the invention, one surface of the liquid crystal display substrate in which the pixels are formed in the matrix state and liquid crystal is sealed between the TFT substrate and the counter electrode substrate is brought into contact with the cooling medium, and the liquid crystal display substrate is irradiated with the light having the predetermined light quantity and the predetermined wavelength in a state in which the predetermined electric field is applied to each pixel, thereby orienting the liquid crystal molecules toward a predetermined direction.

In the liquid crystal display device producing method according to the second aspect of the invention, preferably the liquid crystal display substrate is irradiated with the light from a side of the counter electrode substrate in the step of irradiating the liquid crystal display substrate with the light. Therefore, the liquid crystal display substrate is irradiated with the light having the predetermined wavelength from the side of the counter electrode substrate.

In the liquid crystal display device producing method according to the second aspect of the invention, preferably, in the liquid crystal display substrate, a surface of the TFT substrate on the side opposite from the counter electrode substrate is brought into contact with the cooling medium in the step of bringing one surface of the liquid crystal display substrate into contact with the cooling medium. Therefore, the liquid crystal display substrate is cooled while the surface of the TFT substrate on the side opposite from the counter electrode substrate is brought into contact with the cooling medium.

Preferably the liquid crystal display device producing method according to the first or second aspects of the invention further includes the step of irradiating the liquid crystal display substrate with the light having the predetermined light quantity in a state in which the application of the electric field to each of the pixels is removed after the step of irradiating the liquid crystal display substrate with the light having the predetermined light quantity is performed. Therefore, after the lamp is lighted to irradiate the liquid crystal display substrate with the light having the predetermined light quantity in a state in which the predetermined electric field is applied to each pixel, the liquid crystal display substrate is irradiated with the light having the predetermined light quantity in a state in which the application of the electric field to each pixel is removed.

In accordance with a third aspect of the invention, a liquid crystal display device producing method for irradiating a liquid crystal display substrate, in which plural pixels are formed in a matrix state and liquid crystal is sealed between a TFT substrate and a counter electrode substrate, with light having a predetermined wavelength to orient molecules of the liquid crystal toward a predetermined direction in a state in which a predetermined electric field is applied to each of the pixels of the liquid crystal display substrate, the method includes the steps of: bringing one surface of the liquid crystal display substrate into contact with a cooling medium; irradiating the liquid crystal display substrate with the light having a predetermined light quantity in a state in which the predetermined electric field is applied to each of the pixels; and changing intensity of the electric field applied to each of the pixels at predetermined time intervals while the light irradiation is maintained, when a predetermined time elapses in the light irradiation.

In the configuration of the third aspect of the invention, one surface of the liquid crystal display substrate in which the pixels are formed in the matrix state and liquid crystal is sealed between the TFT substrate and the counter electrode substrate is brought into contact with the cooling medium, the liquid crystal display substrate is irradiated with the light having the predetermined light quantity and the predetermined wavelength in a state in which the predetermined electric field is applied to each pixel, and the intensity of the electric field applied to each pixel is changed while the light irradiation is maintained when the predetermined time elapses in the light irradiation, thereby orienting the liquid crystal molecules toward a predetermined direction.

Preferably the liquid crystal display device producing method according to the third aspect of the invention further includes the step of irradiating the liquid crystal display substrate with the light having the predetermined light quantity in a state in which the application of the electric field to each of the pixels is removed after the step of changing the intensity of the electric field applied to each of the pixels at predetermined time intervals is performed. Therefore, after the intensity of the electric field applied to each pixel is changed at predetermined time intervals while the liquid crystal display substrate is irradiated with the light having the predetermined wavelength, the liquid crystal display substrate is irradiated with the light having the predetermined light quantity in a state in which the application of the electric field to each pixel is removed.

In accordance with a fourth aspect of the invention, a liquid crystal display device producing method for irradiating a liquid crystal display substrate, in which plural pixels are formed in a matrix state and liquid crystal is sealed between a TFT substrate and a counter electrode substrate, with light having a predetermined wavelength to orient molecules of the liquid crystal toward a predetermined direction in a state in which a predetermined electric field is applied to each of the pixels of the liquid crystal display substrate, the method includes the steps of: bringing one surface of the liquid crystal display substrate into contact with a cooling medium; and performing repeatedly one period, in which the application of the electric field to each of the pixels is ON-OFF-ON-switched, predetermined times to irradiate the liquid crystal display substrate with the light having a predetermined light quantity in an initial ON-time-frame of the one period.

In the configuration of the fourth aspect of the invention, one surface of the liquid crystal display substrate in which the pixels are formed in the matrix state and liquid crystal is sealed between the TFT substrate and the counter electrode substrate is brought into contact with the cooling medium, and one period in which the application of the electric field to each pixel is ON-OFF-ON-switched is repeatedly performed predetermined times to irradiate the liquid crystal display substrate with the light having a predetermined light quantity and the predetermined wavelength in the initial ON-time-frame of the one period, thereby orienting the liquid crystal molecules toward a predetermined direction.

Preferably the liquid crystal display device producing method according to the fourth aspect of the invention further includes the step of irradiating the liquid crystal display substrate with the light having the predetermined light quantity in a state in which the application of the electric field to each of the pixels is removed after the step of repeatedly switching the application of the electric field to each of the pixels predetermined times is performed. Therefore, after the switching of the application of the electric field to each pixel is repeatedly performed predetermined times, the liquid crystal display substrate is irradiated with the light having the predetermined light quantity and the predetermined wavelength in a state in which the application of the electric field to each pixel is removed.

In the liquid crystal display device producing method according to the second to fourth aspects of the invention, preferably the cooling medium is water cooled to a predetermined temperature. Therefore, one surface of the liquid crystal display substrate is cooled by the water cooled to the predetermined temperature.

In the liquid crystal display device producing method according to the first to fourth aspects of the invention, preferably the plural lamps are arrayed in a plane parallel to a surface of the liquid crystal display substrate. Therefore, the liquid crystal display substrate is irradiated with the light having the predetermined wavelength using the lamps that are arrayed in the plane parallel to the surface of the liquid crystal display substrate.

In the liquid crystal display device producing method according to the first to fourth aspects of the invention, preferably the lamp is a flashlamp. Therefore, the water-cooled flashlamp emits the light having the predetermined wavelength while being dipped in the liquid and cooled by the liquid.

In the liquid crystal display device producing method according to the first to fourth aspects of the invention, preferably the TFT substrate has a COA (Color filter On Array) configuration in which color filters are continuously formed in an upper surface thereof. Therefore, the orientation of the liquid crystal molecules is performed in the TFT substrate having the COA configuration in which the color filters are continuously formed in the upper surface thereof.

In accordance with a fifth aspect of the invention, a liquid crystal display device producing apparatus that irradiates a liquid crystal display substrate, in which plural pixels are formed in a matrix state and liquid crystal is sealed between a pair of substrates and plural electrodes for driving the pixels are formed in at least two adjacent edge portions, with light having a predetermined wavelength to orient molecules of the liquid crystal toward a predetermined direction in a state in which a current is passed through each of the electrodes of the liquid crystal display substrate to apply a predetermined electric field to each of the pixels, the liquid crystal display device producing apparatus includes: a stage in which a recessed portion for reserving a cooling medium in contact with one surface of the liquid crystal display substrate to cool the liquid crystal display substrate, is formed in a center thereof and a portion near a peripheral edge in one surface of the liquid crystal display substrate is sucked to an upper surface of a sidewall surrounding the recessed portion to retain the liquid crystal display substrate; a prober that is disposed near at least two adjacent edge portions of the stage, and provided with plural terminals to which a current is passed by connecting with the plural electrodes of the liquid crystal display substrate retained by the stage; and a light source device that is disposed above the stage to irradiate the liquid crystal display substrate retained by the state with the light.

In the configuration of the fifth aspect of the invention, the portion near the peripheral edge in one surface of the liquid crystal display substrate in which the pixels are formed in the matrix state and liquid crystal is sealed between the pair of substrates is retained while sucked to the upper surface of the sidewall surrounding the recessed portion formed in the center of the stage, the cooling medium is reserved in the recessed portion, the cooling medium is brought into contact with one surface of the liquid crystal display substrate to cool the liquid crystal display substrate, the terminals of the prober provided near at least two adjacent edge portions of the stage are connected to the electrodes formed in at least two adjacent edge portions of the liquid crystal display substrate to pass the current, and the light source device provided above the stage irradiates the liquid crystal display substrate with the light having the predetermined wavelength in a state in which the electric field is applied to each pixel, thereby orienting the liquid crystal molecules toward a predetermined direction.

In accordance with a sixth aspect of the invention, a liquid crystal display device producing apparatus that irradiates a liquid crystal display substrate, in which plural pixels are formed in a matrix state and liquid crystal is sealed between a pair of substrates and plural electrodes for driving the pixels are formed in at least two adjacent edge portions, with light having a predetermined wavelength to orient molecules of the liquid crystal toward a predetermined direction in a state in which a current is passed through each of the electrodes of the liquid crystal display substrate to apply a predetermined electric field to each of the pixels, the liquid crystal display device producing apparatus includes: a stage for reserving a cooling medium in contact with one surface of the liquid crystal display substrate to cool the liquid crystal display substrate, is formed in a center thereof and a portion near a peripheral edge in one surface of the liquid crystal display substrate is sucked to an upper surface to retain the liquid crystal display substrate; plural wires that are strung on an opening side of the recessed portion to support the one surface of the liquid crystal display substrate retained by the stage; a prober that is disposed near at least two adjacent edge portions of the stage, and provided with plural terminals to which a current is passed by connecting with the plural electrodes of the liquid crystal display substrate retained by the stage; and a light source device that is disposed above the stage to irradiate the liquid crystal display substrate retained by the state with the light.

In the configuration of the sixth aspect of the invention, the portion near the peripheral edge in one surface of the liquid crystal display substrate in which the pixels are formed in the matrix state and liquid crystal is sealed between the pair of substrates is retained while sucked to the upper surface of the sidewall surrounding the recessed portion formed in the center of the stage, one surface of the liquid crystal display substrate retained by the stage is supported by the wires strung on the opening side in the recessed portion, the cooling medium is reserved in the recessed portion, the cooling medium is brought into contact with one surface of the liquid crystal display substrate to cool the liquid crystal display substrate, the terminals of the prober provided near at least two adjacent edge portions of the stage are connected to the electrodes formed in at least two adjacent edge portions of the liquid crystal display substrate to pass the current, and the light source device provided above the stage irradiates the liquid crystal display substrate with the light having the predetermined wavelength in a state in which the electric field is applied to each pixel, thereby orienting the liquid crystal molecules toward a predetermined direction.

Preferably, the liquid crystal display device producing apparatus according to the sixth aspect of the invention includes at least one beam portion that is entrained to support the plural wires from below while intersecting the plural wires. Therefore, the wires are supported from below by at least one beam portion that is entrained while intersecting the wires.

In accordance with a seventh aspect of the invention, a liquid crystal display device producing apparatus that irradiates a liquid crystal display substrate, in which plural pixels are formed in a matrix state and liquid crystal is sealed between a pair of substrates and plural electrodes for driving the pixels are formed in at least two adjacent edge portions, with light having a predetermined wavelength to orient molecules of the liquid crystal toward a predetermined direction in a state in which a current is passed through each of the electrodes of the liquid crystal display substrate to apply a predetermined electric field to each of the pixels, the liquid crystal display device producing apparatus includes: a stage in which a recessed portion for reserving a cooling medium in contact with one surface of the liquid crystal display substrate to cool the liquid crystal display substrate, is formed in a center thereof and a portion near a peripheral edge in one surface of the liquid crystal display substrate is sucked to an upper surface to retain the liquid crystal display substrate; a prober that is disposed near at least two adjacent edge portions of the stage, and provided with plural terminals to which a current is passed by connecting with the plural electrodes of the liquid crystal display substrate retained by the stage; a voltage supply source that supplies a voltage through the prober to apply the electric field to each of the pixels of the liquid crystal display substrate; and a light source device that is disposed above the stage to irradiate the liquid crystal display substrate retained by the state with the light, in which intensity of the electric field applied to each of the pixels is changed at predetermined time intervals by the voltage supply source, when a predetermined time elapses in the irradiation of the liquid crystal display substrate with the light by the light source device in a state in which the electric field is applied to each of the pixels, or one period, at which the application of the electric field to each of the pixels is ON-OFF-ON-switched, is repeatedly performed predetermined times to irradiate the liquid crystal display substrate with the light having a predetermined light quantity in an initial ON-time-frame of the one period.

In the configuration of the seventh aspect of the invention, the portion near the peripheral edge in one surface of the liquid crystal display substrate in which the pixels are formed in the matrix state and liquid crystal is sealed between the pair of substrates and the electrodes for driving the pixels are formed in at least two adjacent edge portions is retained while sucked to the upper surface of the stage in which the recessed portion is formed in the center in order to reserve the cooling medium coming into contact with one surface of the liquid crystal display substrate to cool the liquid crystal display substrate, the terminals of the prober provided near at least two adjacent edge portions of the stage are connected to the electrodes of the liquid crystal display substrate retained by the stage to be able to pass the current, the liquid crystal display substrate that is retained by the light source device provided above the stage is irradiated with the light having the predetermined wavelength in a state in which the voltage supply source supplies the voltage through the prober to apply the predetermined electric field to each pixel of the liquid crystal display substrate, and the voltage supply source changes the intensity of the electric field applied to each pixel at predetermined time intervals when the predetermined time elapses in the irradiation of the liquid crystal display substrate with the light. Alternatively, one period in which the application of the electric field to each of the pixels is ON-OFF-ON-switched is repeatedly performed predetermined times to irradiate the liquid crystal display substrate with the light having a predetermined light quantity in an initial ON-time-frame of the one period.

In the liquid crystal display device producing apparatus according to the seventh aspect of the invention, preferably plural wires that support the one surface of the liquid crystal display substrate are strung on an opening side in recessed portion of the stage. Therefore, one surface of the liquid crystal display substrate retained by the stage is supported by the wires that are strung on the opening side in the recessed portion of the stage.

In the liquid crystal display device producing apparatus according to the fifth to seventh aspects of the invention, preferably, in the light source device, plural lamp units including plural flashlamps are disposed in a matrix state. Therefore, the liquid crystal display substrate is irradiated with the light having the predetermined wavelength using the flashlamps included in the lamp units arrayed in the matrix state.

In the liquid crystal display device producing apparatus according to the fifth to seventh aspect of the invention, preferably the light source device can move relative to the stage in a plane parallel to the stage. Therefore, the light source device moves relative to the stage in the plane parallel to the stage.

In the liquid crystal display device producing apparatus according to the fifth to seventh aspects of the invention, preferably the light source device generates simmer discharge of the plural flashlamps before the light having the predetermined wavelength is lighted. Therefore, the simmer discharge is generated in the flashlamps before the light having the predetermined wavelength is lighted.

In the liquid crystal display device producing apparatus according to the fifth to seventh aspects of the invention, preferably the plural flashlamps are sequentially lighted only for a predetermined time at a predetermined delay time. Therefore, the flashlamps are sequentially lighted only for the predetermined time at the predetermined delay time.

Preferably, the liquid crystal display device producing apparatus according to the fifth to seventh aspects of the invention includes plural photosensors in a bottom surface of the recessed portion of the stage. Therefore, the photosensors in the bottom surface of the recessed portion of the stage detect the light transmitted through the liquid crystal display substrate.

Preferably the liquid crystal display device producing apparatus according to the fifth to seventh aspects of the invention includes a blowoff port and a discharge port in the bottom surface of the recessed portion of the stage, the cooling medium being blown off through the blowoff port to spray the cooling medium to one surface of the sucked and retained liquid crystal display substrate, the cooling medium being discharged through the discharge port. Therefore, the cooling medium is blown off through the blowoff port provided in the bottom surface of the recessed portion of the stage in order to spray the cooling medium to one surface of the sucked and retained liquid crystal display substrate, and the cooling medium is discharged through the discharge port provided in the bottom surface of the recessed portion.

Preferably, the liquid crystal display device producing apparatus according to the fifth to seventh aspects of the invention includes a conveyance unit that carries and carries out the liquid crystal display substrate in and from the stage. Therefore, the conveyance unit carries and carries out the liquid crystal display substrate in and from the stage.

In the liquid crystal display device producing apparatus according to the fifth to seventh aspects of the invention, preferably the conveyance unit conveys the liquid crystal display substrate while sucking a surface on the side opposite from the stage. Therefore, the conveyance unit conveys the liquid crystal display substrate while sucking the surface on the side opposite from the stage.

In the liquid crystal display device producing apparatus according to the fifth to seventh aspects of the invention, preferably an air knife is provided beside the stage on a carry-in and carry-out side of the liquid crystal display substrate to inject compressed air to one surface of the liquid crystal display substrate to thereby blow off the adhering cooling medium. Therefore, the air knife that is provided beside the stage on the carry-in and carry-out side of the liquid crystal display substrate injects the compressed air to one surface of the liquid crystal display substrate to blow off the adhering cooling medium.

In the liquid crystal display device producing apparatus according to the fifth to seventh aspects of the invention, preferably the cooling medium is water cooled to a predetermined temperature. Therefore, one surface of the liquid crystal display substrate is cooled by the water cooled to the predetermined temperature.

In accordance with an eighth aspect of the invention, a liquid crystal display device producing apparatus that irradiates a liquid crystal display substrate, in which plural pixels are formed in a matrix state and liquid crystal is sealed between a pair of substrates, with light having a predetermined wavelength to orient molecules of the liquid crystal toward a predetermined direction in a state in which a predetermined electric field is applied to each of the pixels of the liquid crystal display substrate, the liquid crystal display device producing apparatus includes: a stage in which a recessed portion for reserving a cooling medium in contact with one surface of the liquid crystal display substrate to cool the liquid crystal display substrate, is formed in a center thereof and a portion near a peripheral edge in one surface of the liquid crystal display substrate is sucked to an upper surface to retain the liquid crystal display substrate; and a light source device that is disposed above the stage, in which plural flashlamps that emit the light are provided in a reflector having an opening, the opening having a size corresponding to at least a display region of the liquid crystal display substrate, and plural square-shaped filters are arrayed vertically and horizontally in the opening of the light source device, the filter cutting off transmission of light having a specific wavelength, in which the light source device lights the plural flashlamps in each time the light source device moves by one step while moving vertically and horizontally a distance of an integral multiple of an array pitch of the filters.

In the configuration of the eighth aspect of the invention, the portion near the peripheral edge in one surface of the liquid crystal display substrate in which the pixels are formed in the matrix state and liquid crystal is sealed between the pair of substrates is retained while sucked to the upper surface of a sidewall surrounding the recessed portion formed in the center of the stage, the cooling medium is reserved in the recessed portion formed in the center of the stage in a state in which the electric field is applied to each pixel of the liquid crystal display substrate, the cooling medium is brought into contact with one surface of the liquid crystal display substrate to cool the liquid crystal display substrate, the flashlamps that emit the light having the predetermined wavelength are provided in the reflector having the opening having the size corresponding to at least the display region of the liquid crystal display substrate, and the light source device in which the square-shaped filters cutting off transmission of the light having the specific wavelength are arrayed vertically and horizontally in the opening lights the flashlamps in each time the light source device moves by one step while moving vertically and horizontally the distance of the integral multiple of the array pitch of the filters, thereby orienting the liquid crystal molecules toward a predetermined direction.

In the liquid crystal display device producing apparatus according to the eighth aspect of the invention, preferably the plural filters cut off the transmission of the ultraviolet light whose wavelength is about 300 nm or less. Therefore, the filters cut off the transmission of the ultraviolet light whose wavelength is about 300 nm or less.

In the liquid crystal display device producing apparatus according to the eighth aspect of the invention, preferably a support member that supports an edge portion of each filter is provided between the plural filters. Therefore, the edge portion of each filter is supported by the support member provided between the plural filters.

In the liquid crystal display device producing apparatus according to the eighth aspect of the invention, preferably the light source device generates simmer discharge of the plural flashlamps before the light having the predetermined wavelength is lighted. Therefore, the simmer discharge is generated in the flashlamps before the light having predetermined wavelength is lighted.

In the liquid crystal display device producing method according to the first or second aspect of the invention, the liquid crystal display substrate can be cooled at the same time as the lamp is cooled by the liquid, and the liquid crystal can be prevented from absorbing the light having the predetermined wavelength to be heated to high temperature. Accordingly, the stabilization of the orientation of the liquid crystal molecules can be achieved to stably produce the high-display-quality liquid crystal display device. It is unnecessary to irradiate the liquid crystal display substrate with the light having the predetermined wavelength in a time-division manner, so that production efficiency of the liquid crystal display substrate can be improved.

In the liquid crystal display device producing method according to the first aspect of the invention, the transparent liquid having the resistivity of the predetermined value or more and the sufficiently high transmittance to the ultraviolet light can easily be obtained.

In the liquid crystal display device producing method according to the second aspect of the invention, the liquid crystal display substrate can be irradiated with the light having the predetermined wavelength from the counter electrode substrate side. Accordingly, the liquid crystal orientation can easily be performed in the liquid crystal display substrate including the TFT substrate having the COA (Color filter On Array) configuration in which the color filters are continuously formed in the upper surface, for example.

In the liquid crystal display device producing method according to the second aspect of the invention, the liquid crystal molecules can be oriented while the liquid crystal display substrate is cooled by bringing the surface on the side opposite from the counter electrode substrate of the TFT substrate. Accordingly, when the liquid crystal orientation treatment is performed to the liquid crystal display substrate including the TFT substrate having the COA configuration, for example, because the lamp is disposed on the counter electrode substrate side, the non-water-resistant lamp may be used, and the general, inexpensive lamp can be used.

In the liquid crystal display device producing method according to the first or second aspects of the invention, the liquid crystal molecules oriented toward a predetermined direction can be fixed, and the liquid crystal molecules can be prevented from returning to the initial state after the electric field applied to the pixel is removed. Accordingly, orientation of the liquid crystal molecules can further be stabilized.

In the liquid crystal display device producing method according to the third aspect of the invention, the liquid crystal display substrate can be cooled by the cooling medium, and the liquid crystal can be prevented from absorbing the light having the predetermined wavelength to be heated to high temperature. Accordingly, the stabilization of the orientation of the liquid crystal molecules can be achieved to stably produce the high-display-quality liquid crystal display device. It is unnecessary to irradiate the liquid crystal display substrate with the light having the predetermined wavelength in a time-division manner, so that the production efficiency of the liquid crystal display device can be improved. When the predetermined time elapses in the irradiation of the light having the predetermined wavelength, because the orientation of the electric field applied to each pixel is changed at predetermined time intervals while the light irradiation is maintained, the monomers oscillate in the liquid crystal layer to diffuse easily in the thickness direction of the liquid crystal layer, and the oriented layer is easily formed in the inside surface of the substrate. Accordingly, the orientation treatment time of the liquid crystal display substrate can be shortened to improve the production efficiency of the liquid crystal display device.

In the liquid crystal display device producing method according to the fourth aspect of the invention, the liquid crystal display substrate can be cooled by the cooling medium, and the liquid crystal can be prevented from absorbing the light having the predetermined wavelength to be heated to high temperature. Accordingly, the stabilization of the orientation of the liquid crystal molecules can be achieved to stably produce the high-display-quality liquid crystal display device. It is unnecessary to irradiate the liquid crystal display substrate with the light having the predetermined wavelength in a time-division manner, so that the production efficiency of the liquid crystal display device can be improved. Additionally, one period in which the application of the electric field to each pixel is ON-OFF-ON-switched is repeatedly performed predetermined times to irradiate the liquid crystal display substrate with the light having a predetermined light quantity and the predetermined wavelength in the initial ON-time-frame of the one period. Therefore, the monomers oscillate in the liquid crystal layer to diffuse easily in the thickness direction of the liquid crystal layer and the oriented layer is easily formed in the inside surface of the substrate. Accordingly, the orientation treatment time of the liquid crystal display substrate can be shortened to improve the production efficiency of the liquid crystal display device.

In the liquid crystal display device producing method according to the third or fourth aspects of the invention, the liquid crystal molecules oriented toward a predetermined direction can be fixed, and the liquid crystal molecules can be prevented from returning to the initial state after the electric field applied to the pixel is removed. Accordingly, the orientation of the liquid crystal molecules can further be stabilized.

In the liquid crystal display device producing method according to the second to fourth aspects of the invention, the water cooled to a predetermined temperature can be used as the cooling medium, and the cooling medium is safely, hygienically, and easily handled.

In the liquid crystal display device producing method according to the first to fourth aspects of the invention, the broad surface of the liquid crystal display substrate can evenly be irradiated with the light having the predetermined wavelength. Accordingly, the orientation evenness of the liquid crystal molecules can be secured.

In the liquid crystal display device producing method according to the first to fourth aspects of the invention, the general-purpose lamp can be used, and the apparatus production cost can be reduced.

In the liquid crystal display device producing method according to the first to fourth aspects of the invention, the liquid crystal orientation can easily be performed in the liquid crystal display substrate including the TFT substrate having the COA (Color filter On Array) configuration in which the color filters are continuously formed in the upper surface.

In the liquid crystal display device producing apparatus according to the fifth aspect of the invention, the liquid crystal display substrate can be cooled by the cooling medium, and the liquid crystal can be prevented from absorbing the light having the predetermined wavelength to be heated to high temperature. Accordingly, the stabilization of the orientation of the liquid crystal molecules can be achieved to stably produce the high-display-quality liquid crystal display device. It is unnecessary to irradiate the liquid crystal display substrate with the light having the predetermined wavelength in a time-division manner, so that the production efficiency of the liquid crystal display device can be improved.

In the liquid crystal display device producing apparatus according to the sixth aspect of the invention, the liquid crystal display substrate can be cooled by the cooling medium, and the liquid crystal can efficiently be prevented from absorbing the light having the predetermined wavelength to be heated to high temperature. Accordingly, the stabilization of the orientation of the liquid crystal molecules can be achieved to stably produce the high-display-quality liquid crystal display device. It is unnecessary to irradiate the liquid crystal display substrate with the light having the predetermined wavelength in a time-division manner, so that the production efficiency of the liquid crystal display device can be improved. The liquid crystal display substrate sucked to and retained by the stage is supported from below by the wires, so that the warp of the liquid crystal display substrate can be suppressed. Because the liquid crystal display substrate is not received by pins, there is no risk that the liquid crystal in the surrounding portion of the pin moves partially by a pin pressure to change the orientation state or polymer distribution surrounding the pin. Accordingly, the orientation of the liquid crystal molecules can further be stabilized.

In the liquid crystal display device producing apparatus according to the sixth aspect of the invention, the flexure of the wires is suppressed, and the warp of the liquid crystal display substrate can further be suppressed. Accordingly, the orientation of the liquid crystal molecules can further be stabilized. In such cases, because the liquid crystal display substrate is supported by the wires, the contact between the liquid crystal display substrate and the wire becomes the line contact, the cooling medium can be brought into substantially even contact with one surface of the substrate. Accordingly, one surface of the liquid crystal display substrate can substantially evenly be cooled to prevent the generation of the unevenness of the liquid crystal orientation.

In the liquid crystal display device producing apparatus according to the seventh aspect of the invention, the liquid crystal display substrate can be cooled by the cooling medium, and the liquid crystal can be prevented from absorbing the light having the predetermined wavelength to be heated to high temperature. Accordingly, the stabilization of the orientation of the liquid crystal molecules can be achieved to stably produce the high-display-quality liquid crystal display device. It is unnecessary to irradiate the liquid crystal display substrate with the light having the predetermined wavelength in a time-division manner, so that the production efficiency of the liquid crystal display device can be improved. Additionally, when the predetermined time elapses in irradiating the liquid crystal display substrate with the light having the predetermined wavelength in a state in which the predetermined electric field is applied to each pixel, the intensity of the electric field applied to each pixel is changed at predetermined time intervals, or one period in which the application of the electric field to each pixel is ON-OFF-ON-switched is repeatedly performed predetermined times to irradiate the liquid crystal display substrate with the light having a predetermined light quantity and the predetermined wavelength in the initial ON-time-frame of the one period. Therefore, the monomers oscillate in the liquid crystal layer to diffuse easily in the thickness direction of the liquid crystal layer and the oriented layer is easily formed in the inside surface of the substrate. Accordingly, the orientation treatment time of the liquid crystal display substrate can be shortened to improve the production efficiency of the liquid crystal display device.

In the liquid crystal display device producing apparatus according to the seventh aspect of the invention, the liquid crystal display substrate sucked to and retained by the stage is supported from below by the wires to be able to suppress the warp of the liquid crystal display substrate. Accordingly, the orientation of the liquid crystal molecules can further be stabilized.

In the liquid crystal display device producing apparatus according to the fifth to seventh aspects of the invention, the lighting of the lamp is easily controlled, and the large-size liquid crystal display substrate can collectively be irradiated with the light having the predetermined wavelength. Accordingly, the production efficiency of the liquid crystal display device can be improved.

In the liquid crystal display device producing apparatus according to the fifth to seventh aspects of the invention, the large-size liquid crystal display substrate can evenly be irradiated with the light having the predetermined wavelength. Accordingly, the orientation of the liquid crystal molecules can substantially be aligned in a constant direction in the whole display region of the liquid crystal display substrate.

In the liquid crystal display device producing apparatus according to the fifth to seventh aspects of the invention, the flashlamp can be lighted at high speed. Accordingly, the efficiency of the liquid crystal orientation treatment by the irradiation of the light having the predetermined wavelength can be improved.

In the liquid crystal display device producing apparatus according to the fifth to seventh aspects of the invention, irradiation energy of the light having the predetermined wavelength can be dispersed. Accordingly, temperature rise of the liquid crystal can be suppressed in the liquid crystal display substrate.

In the liquid crystal display device producing apparatus according to the fifth to seventh aspects of the invention, the lighting state of the liquid crystal display substrate can be inspected. In such cases, when the flashlamp that emits the white light by the simmer discharge is used as the backlight, the need to provide another backlight is eliminated, so that the apparatus configuration can be simplified.

In the liquid crystal display device producing apparatus according to the fifth to seventh aspects of the invention, generation of an air layer can be prevented in a contact interface between the liquid crystal display substrate and the cooling medium to improve cooling efficiency of the liquid crystal display substrate.

In the liquid crystal display device producing apparatus according to the fifth to seventh aspects of the invention, the large-size liquid crystal display substrate can safely and easily be carried in and carried out.

In the liquid crystal display device producing apparatus according to the fifth to seventh aspects of the invention, because the cooling medium adhering to the liquid crystal display substrate surface is vacuumed in, the defective suction of the liquid crystal display substrate surface is not generated. Accordingly, there is no risk that the liquid crystal display substrate drops during carry-out and get broken.

In the liquid crystal display device producing apparatus according to the fifth to seventh aspects of the invention, the cooling medium adhering to one surface of the liquid crystal display substrate can be blown off to rapidly dry the substrate.

In the liquid crystal display device producing apparatus according to the fifth to seventh aspects of the invention, the water cooled to a predetermined temperature can be used as the cooling medium, and the cooling medium is safely, hygienically, and easily handled.

In the liquid crystal display device producing apparatus according to the eighth aspect of the invention, one surface of the liquid crystal display substrate is cooled by the cooling medium, so that the liquid crystal can be prevented from absorbing the light having the predetermined wavelength to be heated to high temperature. The flashlamps that emit the light having the predetermined wavelength are provided in the reflector including the opening having the size corresponding to at least the display region of the liquid crystal display device, and the light source device in which the square-shaped filters cutting off the transmission of the light having the specific wavelength are arrayed vertically and horizontally in the opening lights the flashlamps in each time the light source device moves by one step while moving vertically and horizontally the distance of the integral multiple of the array pitch of the filters by predetermined steps, so that the large-area substrate can evenly be irradiated with the light having the predetermined wavelength. Accordingly, the orientation of the liquid crystal molecules can be stabilized in the whole surface of the display region of the liquid crystal display substrate.

In the liquid crystal display device producing apparatus according to the eighth aspect of the invention, the filter can cut off the transmission of the ultraviolet light whose wavelength is about 300 nm or less, and the liquid crystal can be prevented from receiving the damage of the ultraviolet light.

In the liquid crystal display device producing apparatus according to the eighth aspect of the invention, the filters can easily be attached to the opening of the reflector.

In the liquid crystal display device producing apparatus according to the eighth aspect of the invention, the flashlamp can be lighted at high speed while the flashlamp that emits the white light by the simmer discharge is used as the backlight. Accordingly, the efficiency of the liquid crystal orientation treatment by the ultraviolet light irradiation can be improved.

BRIEF DESCRIPTION OF THE DRAWINGS

FIGS. 12A to 12F are a timing chart for driving the light source device of FIG. 11;

FIGS. 22A to 22C are a timing chart illustrating another example of driving timing between a voltage supply source and a light source device in the liquid crystal display device producing method of FIG. 20;

DETAILED DESCRIPTION OF THE PREFERRED EMBODIMENT

Figure 1:
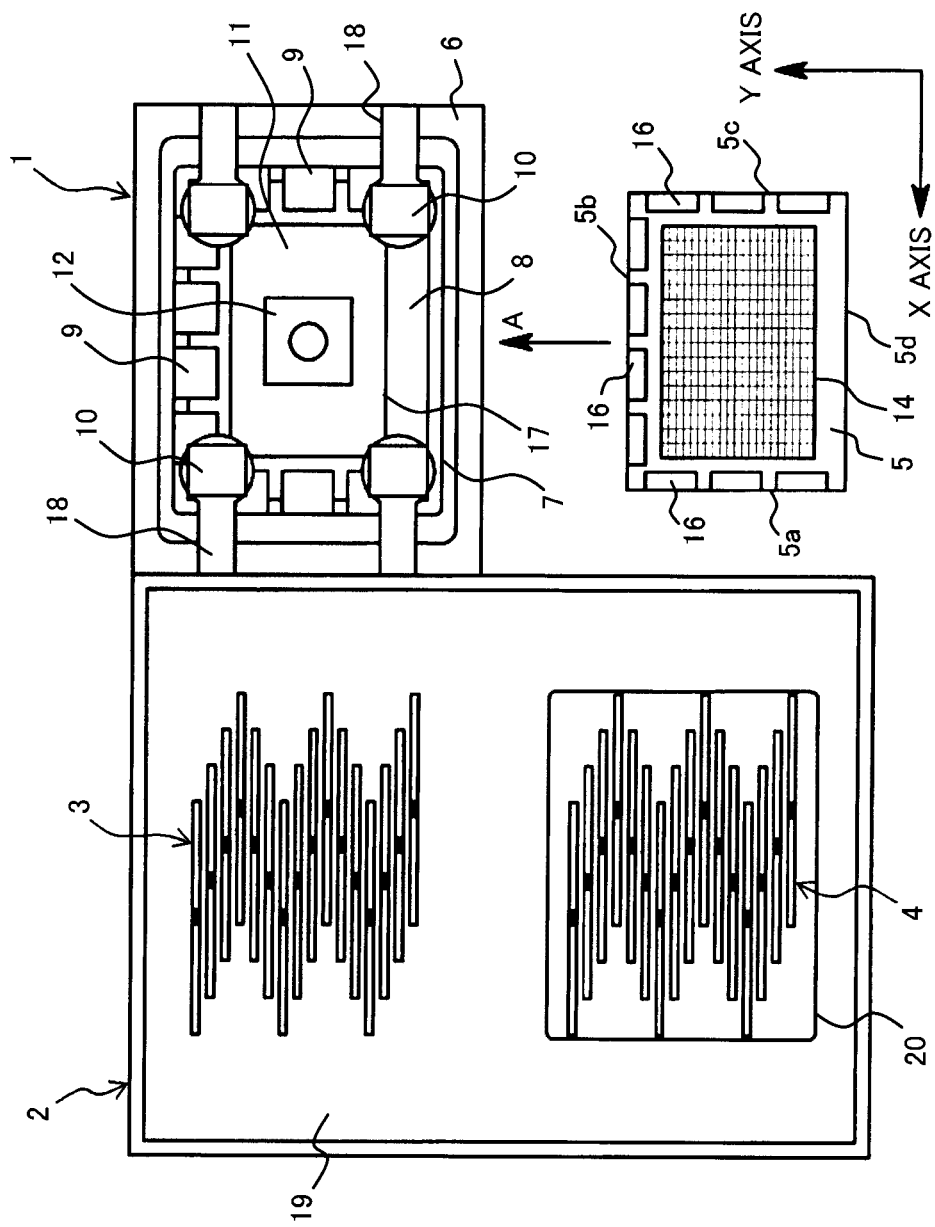
FIG. 1 is a plan view illustrating a liquid crystal display device producing apparatus according to a first embodiment of the invention.

Hereunder is a detailed description of exemplary embodiments of the present invention with reference to the accompanying drawings. FIG. 1 is a plan view illustrating a liquid crystal display device producing apparatus according to a first embodiment of the invention. In the liquid crystal display device producing apparatus of the first embodiment, a liquid crystal display substrate in which liquid crystal is sealed between a TFT substrate and a counter electrode substrate is irradiated with ultraviolet light while an electric field is applied to the liquid crystal display substrate, thereby orienting liquid crystal molecules toward a predetermined direction. The liquid crystal display device producing apparatus includes a lighting inspection device 1, a water tank 2, a first lamp 3, and a second lamp 4.

Figure 2:
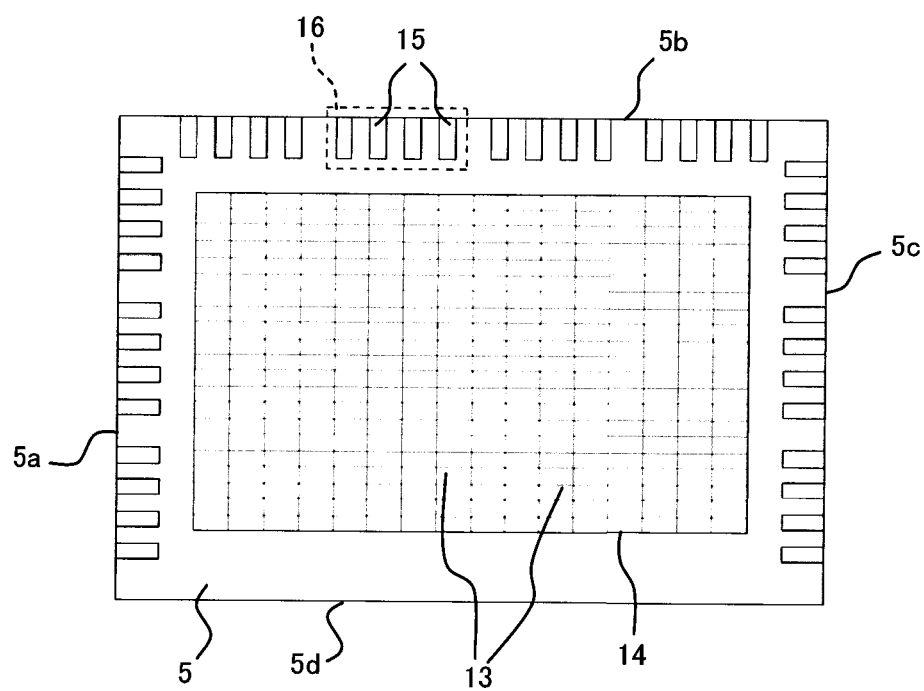
FIG. 2 is a plan view illustrating a configuration example of a liquid crystal display substrate used in the first embodiment.

The lighting inspection device 1 performs lighting inspection of a liquid crystal display substrate 5 in which the liquid crystal is sealed. A device body 6 of the lighting inspection device 1 includes a movable portion 7, a stage 8, a probe unit 9, an alignment camera 10, a backlight 11, and a lighting inspection camera 12. At this point, the liquid crystal display substrate 5 has a COA (Color filter On Array) configuration in which color filters are continuously formed above the TFT substrate. As illustrated in FIG. 2, the liquid crystal display substrate 5 includes a display region 14 located in a central portion and plural electrode groups 16 located near three edge portions 5a, 5b, and 5c. The display region 14 includes plural pixels 13 in a matrix state. In each of the electrode groups 16, plural electrodes 15 are arrayed in order to supply driving signals to the pixels 13.

The movable portion 7 supports the stage 8 and the probe unit 9 described later. The movable portion 7 moves in an X-axis direction in an XY-plane of FIG. 1 by a movement mechanism (not illustrated) while moving in a depth direction (Z-axis direction) of FIG. 1 on the water tank 2 described later.

The stage 8 is provided inside the movable portion 7. In the stage 8, the liquid crystal display substrate 5 conveyed in a direction of an arrow A of FIG. 1 by a loader, for example, is sucked and retained while placed on an upper surface, and a rectangular opening 17 is provided in a central portion according to the display region 14 of the placed liquid crystal display substrate 5 such that the light of the backlight 11 described later can pass therethrough. In side portions of a back side of two sides orthogonal to the arrow A of the opening 17 and one (the right side in FIG. 1) of two sides parallel to the arrow A, plural positioning pins (not illustrated) are rigidly provided in an upper surface of the stage 8. Two edge portions 5b and 5c orthogonal to each other in the liquid crystal display substrate 5 placed on the stage 8 are controlled by the positioning pins, which allows the liquid crystal display substrate 5 to be positioned at a predetermined position. Movable pins (not illustrated) are provided in diagonal directions of the stage 8 according to the positioning pins, and the movable pins push edge portions 5a and 5d on the opposite side to the edge portions 5b and 5c of the placed liquid crystal display substrate 5 and press the liquid crystal display substrate 5 against the positioning pins. The stage 8 raises and lowers the inside of the movable portion 7 by using a lifting mechanism (not illustrated).

In side portions of a back side of two sides orthogonal to the arrow A in FIG. 1 of the opening 17 and two sides parallel to the arrow A, the plural probe units 9 are provided on the movable portion 7. The probe unit 9 is used to supply a bias voltage from an externally provided power supply (not illustrated) to the plural pixels 13 of the liquid crystal display substrate 5. The probe unit 9 includes plural probes that come into contact with plural electrodes 15 formed near the three edge portions 5a to 5c of the liquid crystal display substrate 5, and the probes are raised and lowered to bring and separate probe leading end portions into contact with and from the electrodes 15 of the liquid crystal display substrate 5. The plural probe units 9 are configured to turn integrally about a shaft parallel to a Z-axis, which allows each of the probe leading end portions to be aligned with the electrodes 15 of the liquid crystal display substrate 5.

The alignment cameras 10 are provided near four corner portions of the stage 8 while retained in the device body 6 by support members 18. Each of the alignment cameras 10 takes images of both the electrode 15 of the liquid crystal display substrate 5 and the probe leading end portion of the probe unit 9 such that all the probe leading end portions are correctly positioned on the corresponding electrodes 15. The alignment camera 10 includes a CCD camera, which enables the alignment to be automatically adjusted by pattern matching. The support members 18 are slid in a longitudinal axis direction thereof, and the support members 18 are retreated out of a visual field of the lighting inspection camera 12 described later during the lighting inspection of the liquid crystal display substrate 5.

The backlight 11 is provided below the stage 8 according to the opening 17. The backlight 11 irradiates the liquid crystal display substrate 5 placed on the stage 8 with white light from a rear surface side of the liquid crystal display substrate 5 to enable the lighting inspection of the liquid crystal display substrate 5. For example, the backlight 11 includes a cold cathode discharge tube.

The lighting inspection camera 12 is provided above the stage 8 according to the opening 17. The lighting inspection camera 12 takes an image of a surface of the liquid crystal display substrate 5 to inspect whether a non-lighting portion exists in the liquid crystal display substrate 5. For example, the lighting inspection camera 12 includes a CCD camera.

The water tank 2 is provided beside the lighting inspection device 1. A transparent liquid 19 is reserved in the water tank 2, and the liquid 19 has resistivity of a predetermined value or more and has sufficiently high transmittance to the ultraviolet light. A top of the water tank 2 is opened, and the liquid crystal display substrate 5 can be dipped in the liquid 19 from above. A circulation pipe (not illustrated) for the liquid 19 is connected to a side face of the water tank 2, the liquid 19 in the water tank 2 is circulated with an externally provided pump, and a temperature of the liquid 19 is kept constant by a chiller provided on the way. When possibly the resistivity of the liquid 19 is lowered because part of the liquid 19 is ionized by irradiating the liquid 19 with the ultraviolet light, an ion exchanger may be connected to the circulation pipe to perform ion exchange such that the resistivity of the predetermined value or more is maintained.

In such cases, the pure water that includes distilled water or ion-exchanged water having the resistivity (specific resistance) of about $1 \times 10^5$ Ωcm or more, preferably the resistivity of about $1 \times 10^6$ Ωcm or more is suitable to the liquid 19. Alternatively, an anti-freeze solution may be used as the liquid 19.

The first ultraviolet light (UV) lamp 3 is provided above the water tank 2 so as to face the conveyed liquid crystal display substrate 5. In the first lamp 3, the liquid crystal display substrate 5 in which the electric field is applied to each pixel 13 is irradiated with the light having a predetermined wavelength including the ultraviolet light to orient the liquid crystal molecules toward a predetermined direction. For example, the first lamp 3 includes a long and thin water-cooled xenon flashlamp. The plural first lamps 3 are arrayed in parallel with the surface of the liquid crystal display substrate 5 such that the surface of the liquid crystal display substrate 5 can evenly be irradiated with the light. The first lamp 3 and the movable portion 7 positioned therebelow concurrently move in the Z-axis direction by the lamp movement mechanism (not illustrated), and the first lamp 3 and the liquid crystal display substrate 5 placed on the stage 8 are concurrently dipped in the liquid 19 with which the water tank 2 is filled. The wavelength of the light ranges from about 300 nm to about 1100 nm, preferably about 300 nm to about 400 nm, more preferably about 300 nm to about 400 nm and about 800 nm to about 1100 nm. In the first embodiment, the case where the light is "ultraviolet light" will be described below.

Above the water tank 2, the second lamp 4 is provided beside the first lamp 3. The second lamp 4 fixes the orientation state in which the liquid crystal display substrate 5 is irradiated with the ultraviolet light of the first lamp 3 to orient the liquid crystal molecules toward the predetermined direction. In the second lamp 4, the liquid crystal display substrate 5 in which the application of the electric field to each pixel 13 is removed is irradiated with the ultraviolet light that is identical to that of the first lamp 3 having a predetermined light quantity. Similarly to the first lamp 3, the second lamp 4 includes the long and thin water-cooled xenon flashlamp, and the plural second lamps 4 are arrayed in parallel with the surface of the liquid crystal display substrate 5, which is transferred from the stage 8 by a conveyance mechanism provided in the water tank 2 and positioned below the second lamps 4, such that the surface of the liquid crystal display substrate 5 can evenly be irradiated with the ultraviolet light. The second lamp 4 and a lifting table 20 provided therebelow are concurrently raised and lowered in the Z-axis direction by another movement mechanism (not illustrated), the second lamps 4 and the liquid crystal display substrate 5 placed on the lifting table 20 concurrently emerge from the liquid 19, so that the liquid crystal display substrate 5 can be carried out with an unloader. The first and second lamps 3 and 4 are not limited to the water-cooled xenon flashlamp but the first and second lamps 3 and 4 may be a water-cooled lamp that continuously emits the light.

Figure 3:
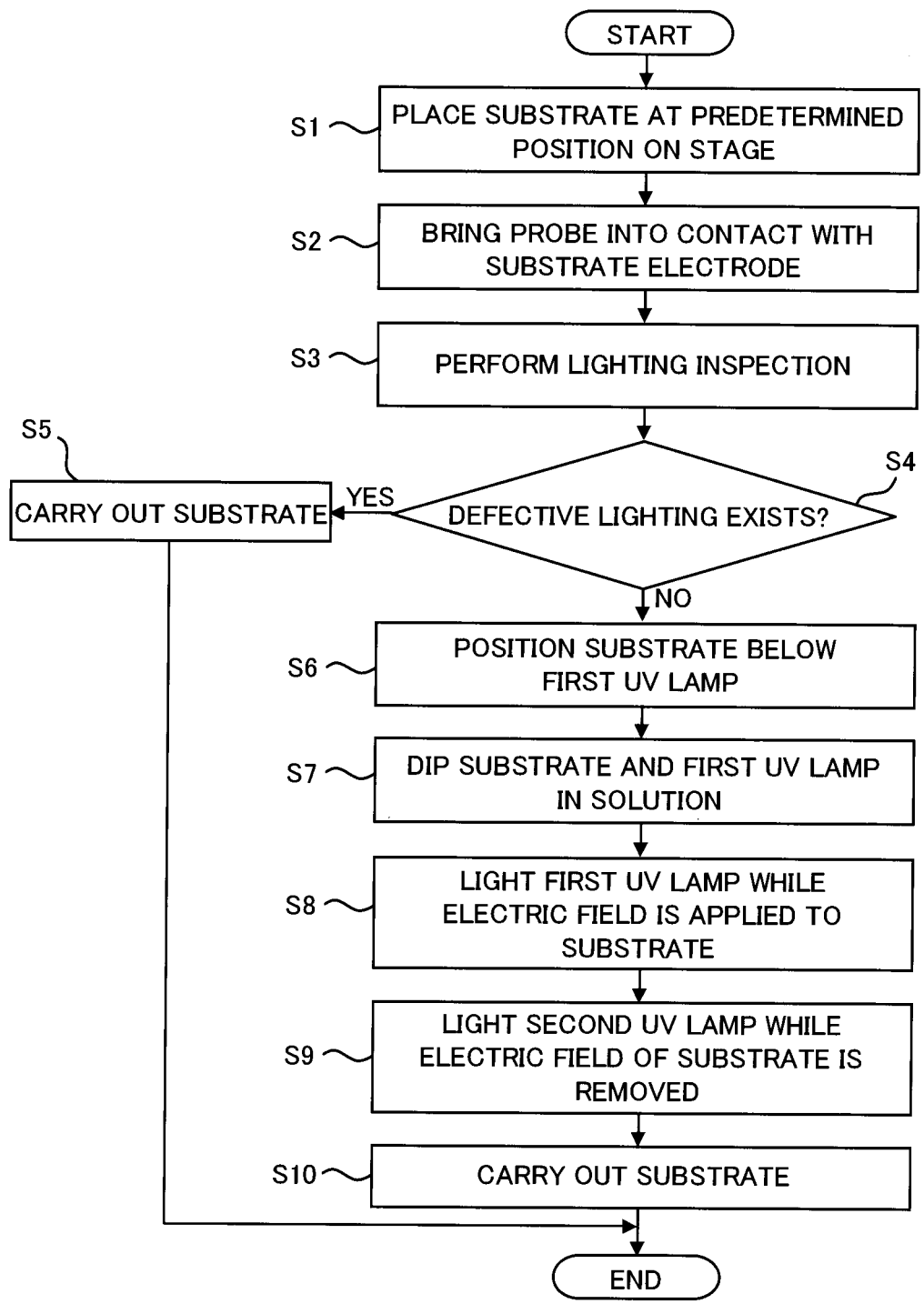
FIG. 3 is a flowchart illustrating a liquid crystal display device producing method of the first embodiment.

An operation of the liquid crystal display device producing apparatus of the first embodiment having the above-described configuration and a liquid crystal display device producing method that is performed with the producing apparatus will be described below with reference to a flowchart of FIG. 3. In Step S1, the liquid crystal display substrate 5 is conveyed with a counter electrode substrate side up in the direction of the arrow A illustrated in FIG. 1 by the loader (not illustrated), and the liquid crystal display substrate 5 is placed on the stage 8 of the lighting inspection device 1. At this point, in the liquid crystal display substrate 5, the two edge portions 5a and 5d are pressed in the diagonal direction by the movable pins, and the two edge portions 5b and 5c on the opposite sides are positioned by abutting evenly on the positioning pins provided in the stage 8. Then the liquid crystal display substrate 5 is sucked to and retained by the stage 8. Therefore, the positions of the electrodes 15 provided near the edge portions of the liquid crystal display substrate 5 and the positions of the probe leading end portions of the probe units 9 are coarsely adjusted.

In Step S2, the alignment cameras 10 are started up. At the same time, the stage 8 is raised to a position at which the alignment camera 10 can take images of both the electrode 15 of the liquid crystal display substrate 5 and the probe leading end portion of the probe unit 9. At this point, the whole probe units 9 turn integrally such that the electrodes 15 and the probe leading end portions are aligned by pattern matching based on the taken image, whereby the electrodes 15 and the probe leading end portions are correctly positioned. When the alignment between the electrodes 15 and the probe leading end portions are ended, the probes of the probe units 9 are lowered to bring the probe leading end portions into contact with the electrodes 15.

In Step S3, the lighting inspection of the liquid crystal display substrate 5 is performed. Specifically, the lighting inspection camera 12 is started up, and the bias voltage is supplied from the externally provided power supply to the electrodes 15 to apply the predetermined electric field to each pixel 13 of the liquid crystal display substrate 5. The backlight 11 is lighted to irradiate the rear surface of the liquid crystal display substrate 5 with the white light. The alignment cameras 10 are retreated out of the visual field of the lighting inspection camera 12 by sliding the support members 18 in the longitudinal axis direction of the support members 18. At this point, the lighting inspection camera 12 takes the image of the liquid crystal display substrate 5 with the light transmitted through the liquid crystal display substrate 5, and the lighting inspection is performed.

In Step S4, a determination whether the defective lighting exists is made based on the image taken with the lighting inspection camera 12. When the defective lighting is detected to make a "YES" determination, the flow goes to Step S5, and the liquid crystal display substrate 5 is determined to be defective and carried out.

On the other hand, when the defective lighting is not detected in Step S4, a "NO" determination is made, and the flow goes to Step S6.

In Step S6, the backlight 11, the alignment cameras 10 and the lighting inspection camera 12 are turned off. The liquid crystal display substrate 5 and the movable portion 7 are concurrently and horizontally conveyed in the X-axis direction of FIG. 1 by the movement mechanism of the movable portion 7, and the liquid crystal display substrate 5 and the movable portion 7 are positioned below the first lamp 3 and above the water tank 2 to go into a standby state for the dip in the liquid 19 of the water tank 2.

In Step S7, the liquid crystal display substrate 5 and the first lamp 3 are lowered by the movement mechanism together and dipped in the transparent liquid 19 (for example, pure water) having the resistivity of the predetermined value or more and the sufficiently high transmittance to the ultraviolet light. At this point, the resistivity of the liquid 19 is measured with a liquid resistivity measurement instrument to confirm that the resistivity is not lower than the predetermined value. When the resistivity is lower than the predetermined value, the liquid 19 is passed through the ion exchanger to wait for recovery of the resistivity. The circulation of the liquid 19 is started, a flow rate is set to about 1 m/sec relative to the substrate surface, and the liquid 19 is cooled such that a temperature of the liquid 19 becomes about 24° C. The lifting table 20 that is provided opposite the second lamp 4 and the lamp also are lowered when the liquid crystal display substrate 5 and the first lamp 3 are lowered in the Z-direction.

In Step S8, in a state in which the predetermined electric field is applied to each pixel 13 of the liquid crystal display substrate 5, the first lamp 3 is lighted to irradiate the liquid crystal display substrate 5 with the ultraviolet light having the predetermined light quantity. Therefore, the liquid crystal molecules are oriented toward the predetermined direction. At this point, usually the liquid crystal absorbs the ultraviolet light to generate the heat. However, in the first embodiment, because the liquid crystal display substrate 5 is cooled by the liquid 19, the liquid crystal is maintained at the temperature of about 24° C. The amount of electric field and the amount of ultraviolet light irradiation are set to proper values based on previous experiments.

In Step S9, while the application of the electric field to each pixel 13 of the liquid crystal display substrate 5 is removed, the second lamp 4 is lighted to irradiate the liquid crystal display substrate 5 with the ultraviolet light having the predetermined light quantity, thereby fixing the orientation state of the liquid crystal molecules that are oriented toward the predetermined direction in Step S8. Specifically, when the orientation treatment is ended in Step S8, the probes are raised to separate the probe leading end portions from the electrodes 15 of the liquid crystal display substrate 5. Then the liquid crystal display substrate 5 is transferred onto the lifting table 20 by the conveyance mechanism and disposed opposite the second lamp 4. At this point, the second lamp 4 is lighted to irradiate the liquid crystal display substrate 5 with the ultraviolet light having the light quantity larger than that of the ultraviolet light in Step S8, thereby fixing the orientation state of the liquid crystal molecules. Because the liquid crystal display substrate 5 is cooled by the liquid 19, the temperature of the liquid crystal can be suppressed to about 24° C. When the liquid crystal display substrate 5 is transferred to the lifting table 20, the first lamp 3 and the movable portion 7 are raised together, the first lamp 3 is stopped at the moving-up position, and the movable portion 7 further moves in the X-axis direction by the movement mechanism to return to a predetermined position of the lighting inspection device 1.

In Step S10, when the orientation treatment of the liquid crystal is completed, the circulation of the liquid 19 is stopped. Similarly the second lamp 4 and the lifting table 20 are raised together to carryout the liquid crystal display substrate 5 from the liquid 19. The liquid crystal display substrate 5 is carried out by the unloader to end all the processes of the liquid crystal display device producing method of the first embodiment.

In Step S8, in which the first lamp 3 irradiates the liquid crystal display substrate 5 with the ultraviolet light, the process in Step S9 may be eliminated when the liquid crystal molecules are stably oriented.

The processes of irradiating the liquid crystal display substrate 5 with the ultraviolet light in Steps S8 and S9 may be performed only by the first lamp 3. In such cases, after the process of irradiating the liquid crystal display substrate 5 with the ultraviolet light in Step S8 is performed, the process of irradiating the liquid crystal display substrate 5 with the ultraviolet light in Step S9 is performed using the first lamp 3 while the application of the electric field to each pixel 13 of the liquid crystal display substrate 5 is removed.

In the first embodiment, the first and second lamps 3 and 4 are raised and lowered, and the first and second lamps 3 and 4 are lowered and placed in the liquid 19 during the ultraviolet light irradiation. The invention is not limited to the first embodiment, but each lamp may rigidly be disposed while sunk in the liquid 19 of the water tank 2. At this point, the liquid crystal display substrate 5 is conveyed with the counter electrode substrate side down, and the liquid crystal display substrate 5 may be irradiated with the ultraviolet light from below.

Figure 4:
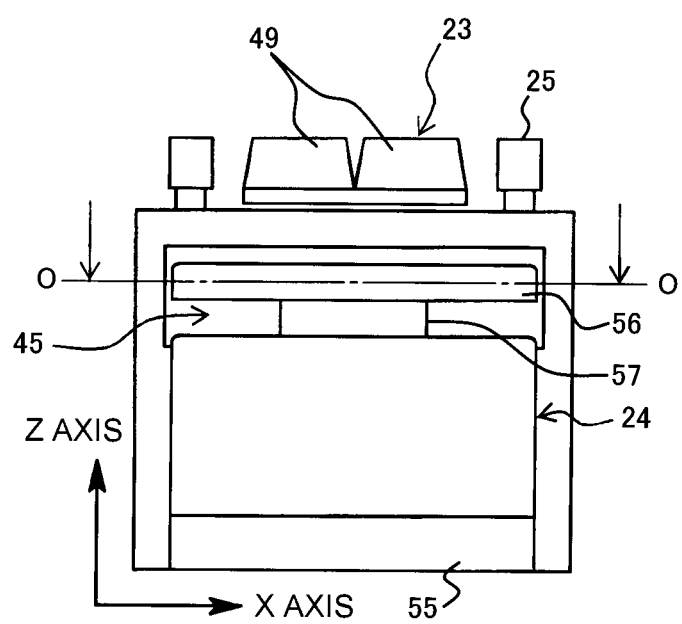
FIG. 4 is a front view illustrating a liquid crystal display device producing apparatus according to a second embodiment of the invention.
Figure 5:
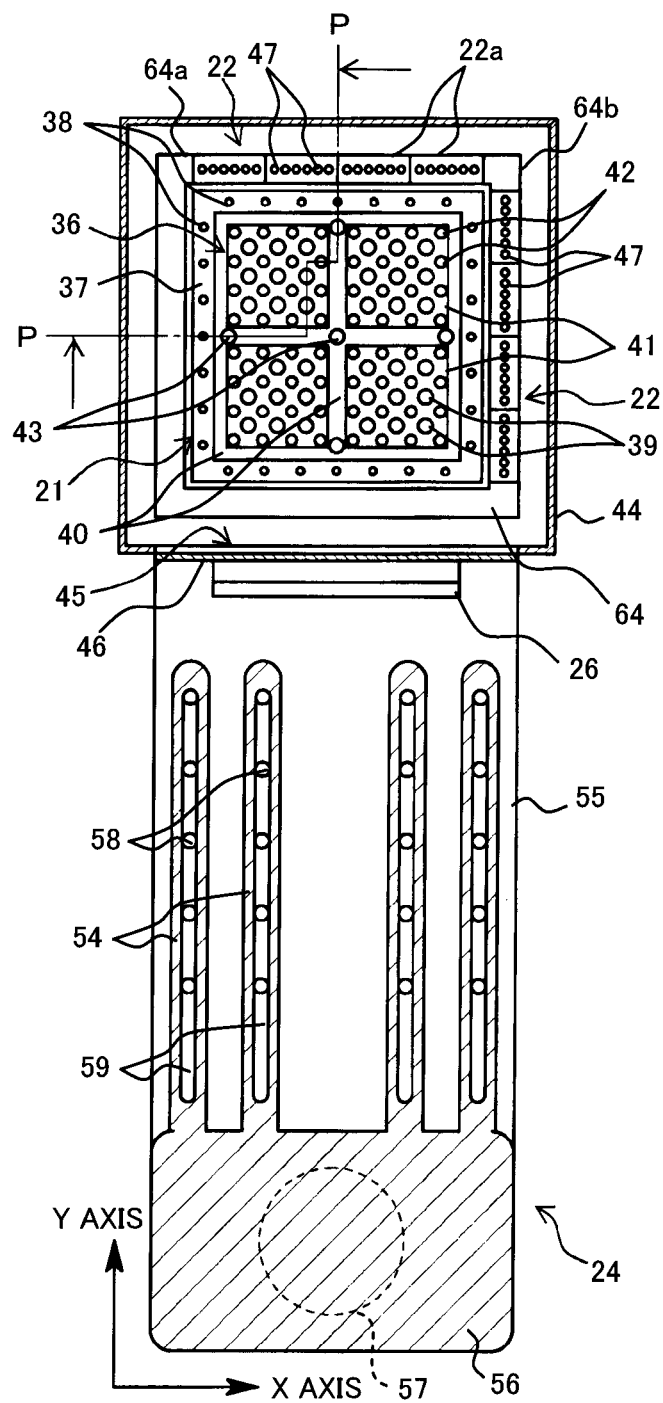
FIG. 5 is a sectional view taken on line O-O of FIG. 4.
Figure 6:
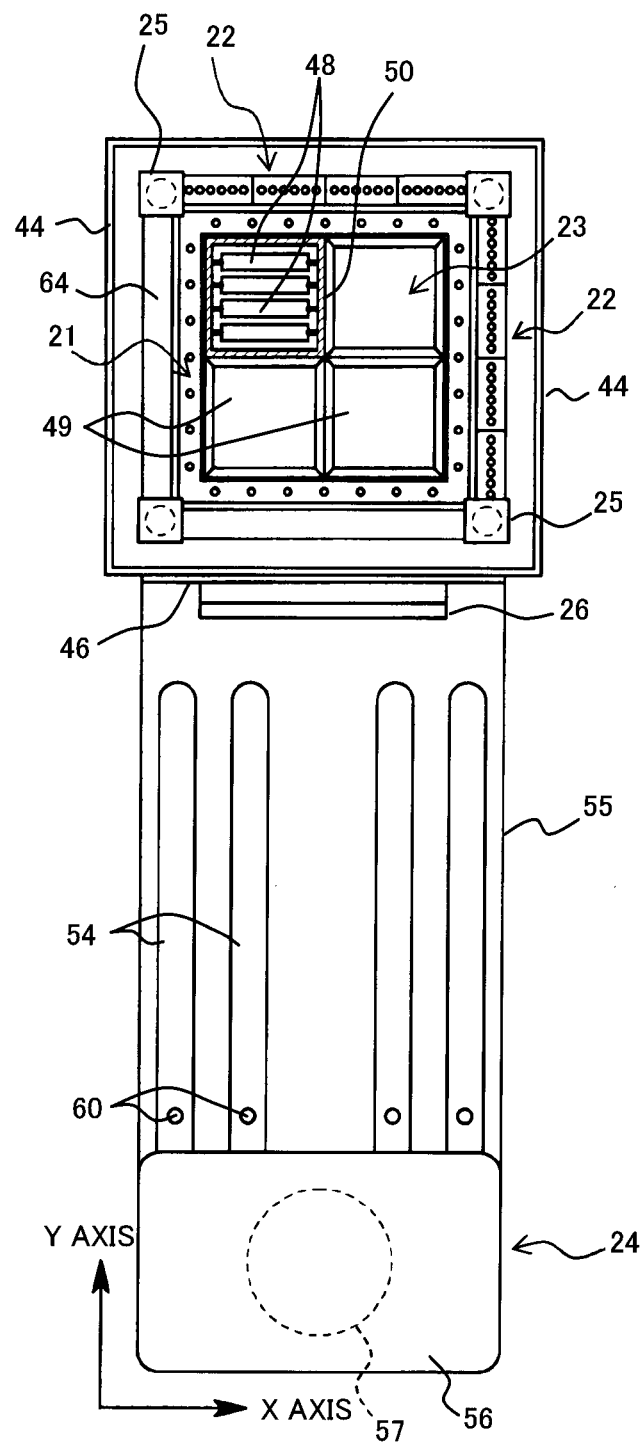
FIG. 6 is a partially sectional view of FIG. 4.
Figure 7:
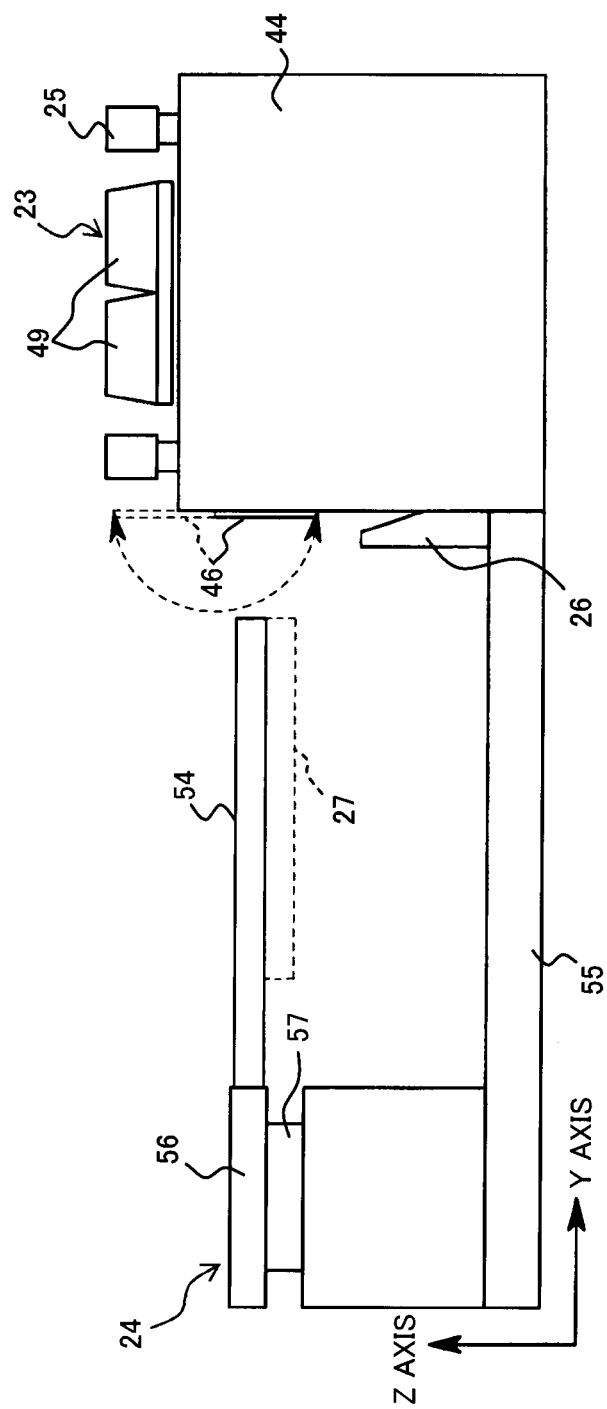
FIG. 7 is a side view of FIG. 4.

FIG. 4 is a front view illustrating a liquid crystal display device producing apparatus according to a second embodiment of the invention, FIG. 5 is a sectional view taken on line O-O of FIG. 4, FIG. 6 is a partially sectional view of FIG. 4, and FIG. 7 is a right side view of FIG. 4. The liquid crystal display device producing apparatus of the second embodiment includes a stage 21, a prober 22, a light source device 23, a conveyance unit 24, an alignment camera 25, and an air knife 26.

Figure 8:
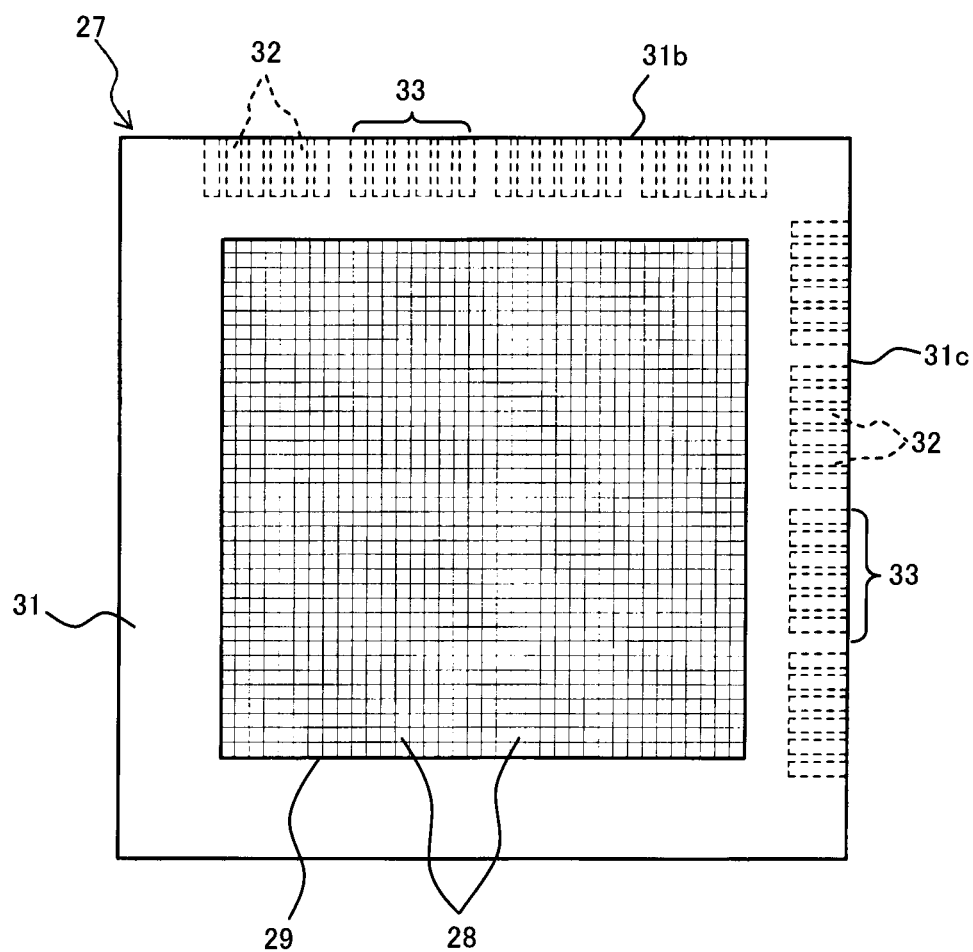
FIG. 8 is a plan view illustrating a configuration example of a liquid crystal display substrate used in the producing apparatus of the second embodiment.
Figure 9:
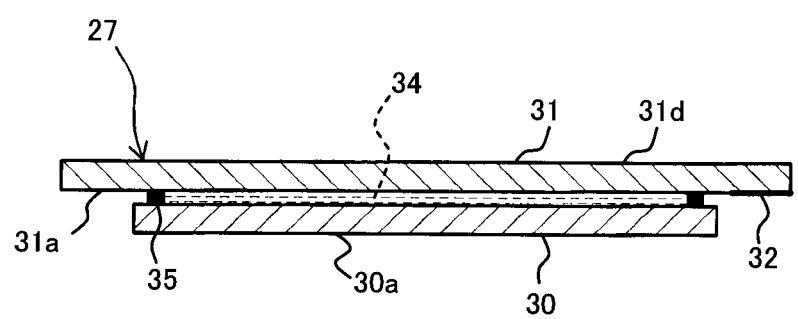
FIG. 9 is a sectional view taken on center line of the liquid crystal display substrate of FIG. 8.

Similarly to the first embodiment, a liquid crystal display substrate 27 used in the second embodiment has the COA (Color filter On Array) configuration in which the color filters are continuously formed on the TFTs. As illustrated in FIG. 8, the liquid crystal display substrate 27 includes a display region 29 located in the central portion thereof, and the display region 29 includes plural pixels 28 arrayed in the matrix state. As illustrated in FIG. 9, a size of a counter electrode substrate 31 is larger than that of a TFT substrate 30. In at least two edge portions 31b and 31c adjacent to each other (see FIG. 8), the liquid crystal display substrate 27 includes plural electrode groups 33 in a surface 31a of the counter electrode substrate 31 on the side of the TFT substrate 30. In the electrode group 33, plural electrodes 32 are arrayed in order to supply driving signals to the pixels 28. In FIG. 9, the numeral 34 designates a liquid crystal layer and the numeral 35 designates a sealing material.

Figure 10:
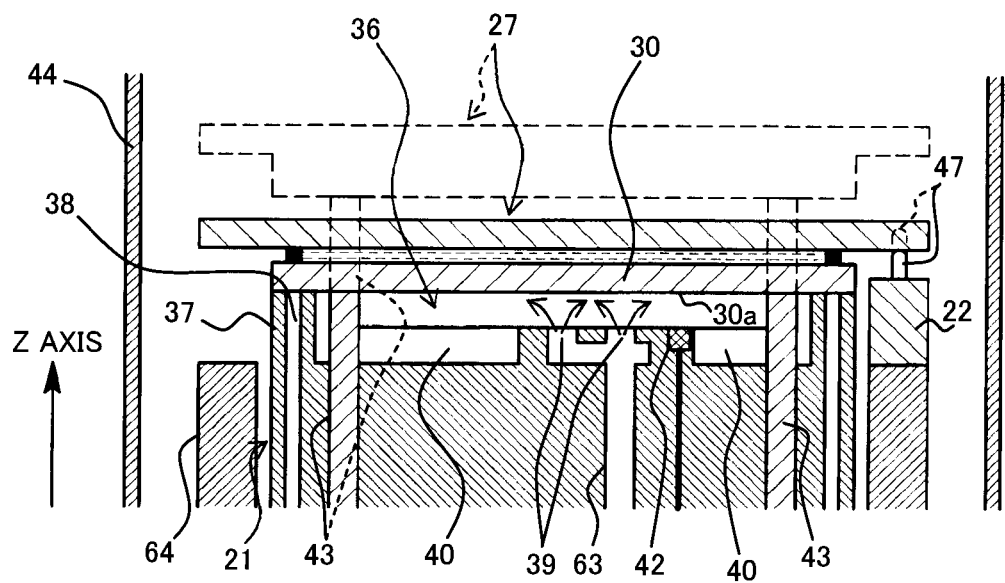
FIG. 10 is a sectional view taken on line P-P of FIG. 5.

The stage 21 sucks and retains the liquid crystal display substrate 27. As illustrated in FIGS. 5 and 10, a recessed portion 36 is formed in the central portion of the stage 21. Cooling water, such as water for household use, industrial water, and pure water, which is cooled at about 24° C. can be reserved in the recessed portion 36 as a cooling medium that comes into contact and cools one surface of the liquid crystal display substrate 27. An upper surface of a sidewall portion 37 surrounding the recessed portion 36 is smoothly formed, plural suction and blowoff ports 38 are formed in the upper surface, air is vacuumed in from each of the suction and blowoff ports 38 to suck a peripheral edge neighboring portion in a rear surface 30a of the TFT substrate 30 of the liquid crystal display substrate 27 to the upper surface of the sidewall portion 37, and air is blown off from each of the suction and blowoff ports 38 to float the liquid crystal display substrate 27. A pipe (not illustrated) is connected to each of the suction and blowoff ports 38. Tail ends of the pipes are unified and connected to change-over valves of two systems, one of the change-over valves is connected to a suction pump (not illustrated), and the other is connected to an air compressor (not illustrated). When the liquid crystal display substrate 27 is sucked and retained on the stage 21, the change-over valve is switched onto the suction pump side to vacuum in air from the suction and blowoff port 38. In coarsely adjusting the alignment between the liquid crystal display substrate 27 and probers 22 described later, and in carrying out the liquid crystal display substrate 27, the change-over valve is switched onto the air compressor side, and air is blown off from the suction and blowoff port 38 to float the liquid crystal display substrate 27.

At this point, plural blowoff ports 39 and a discharge port (not illustrated) are provided in a bottom surface of the recessed portion 36. The blowoff ports 39 blow off the cooling water to spay the cooling water to the rear surface 30a of the TFT substrate 30 of the liquid crystal display substrate 27 that is sucked and retained by the stage 21. The cooling water is discharged through the discharge port. The discharge port is provided so as to be connected to plural drain grooves 40 that are provided while crossed lengthwise and crosswise as illustrated in FIG. 5. Each of the blowoff ports 39 is provided inside plural islands 41 surrounded by the drain grooves 40, and one end of a feed-water path 63 constitutes each of the blowoff ports 39 as illustrated in FIG. 10. A feed-water pipe (not illustrated) is connected to the other end of the feed-water path 63, and a tail end of the feed-water pipe is connected to a feed-water pump that pipes up the cooling water from a water storage tank (not illustrated). A drain pipe (not illustrated) is connected to the discharge port, and a tail end of the drain pipe is connected to the water storage tank to be able to circulate the cooling water.

In the bottom surface of the recessed portion 36, plural photosensors 42 are provided in each of the islands 41. The photosensor 42 inspects the lighting state of the liquid crystal display substrate 27 and receives the light transmitted through the liquid crystal display substrate 27.

In the bottom surface of the recessed portion 36, plural lift pins 43 are provided in the drain groove 40. The lift pins 43 and the rear surface 30a of the TFT substrate 30 of the liquid crystal display substrate 27 are raised and lowered together while the lift pins 43 support the rear surface 30a, and leading end positions of the lift pins 43 are formed so as to be substantially flush with one another. A water leakage prevention treatment is performed to the surroundings of the lift pin 43 such that the cooling water does not leak through the lift pin 43.

The probers 22 are provided in at least two edge portions 64a and 64b adjacent to each other (see FIG. 5) in a frame-shaped prober retaining portion 64 that is provided while surrounding the stage 21. In the prober 22, plural prober units 22a including plural terminals 47 are arrayed. The terminals 47 come into contact with plural electrodes 32 formed in the edge portion of the liquid crystal display substrate 27, thereby passing a current. The leading end portions of the terminals 47 are projected upward from the upper surface of the sidewall portion 37 of the stage 21 (see FIG. 10) so as to be able to come into contact with the electrodes 32 formed in the counter electrode substrate 31 of the liquid crystal display substrate 27 placed on the stage 21. The terminals 47 are contact pins that are formed in stretchable manner so as to contract in externally applying a pressing force and so as to return to the original state in removing the pressing force. The terminals 47 are configured to come into contact with the electrodes 32 of the liquid crystal display substrate 27 placed on the stage 21 at a substantially constant pressure. The prober retaining portion 64 is formed while being movable in the X-axis and Y-axis directions, and the prober retaining portion 64 is formed while being turnable about an axis thereof. This enables the terminals 47 of the probers 22 to be aligned with the electrodes 32 of the liquid crystal display substrate 27.

The stage 21 and the prober retaining portion 64 are accommodated inside a chassis 44 that is provided while surrounding the stage 21 and the prober retaining portion 64. The liquid crystal display substrate 27 can be carried in and carried out from the stage 21 through a carry-in and carry-out port 45 formed in a side face of the chassis 44. A shutter 46 is attached to the carry-in and carry-out port 45 in order to turn in the arrow direction indicated by a broken line of FIG. 7 to open and close the carry-in and carry-out port 45. The carry-in and carry-out port 45 is closed during the ultraviolet light irradiation such that the ultraviolet light does not leak to the outside.

The light source device 23 is provided above the stage 21. The light source device 23 irradiates the liquid crystal display substrate 27 retained by the stage 21 with the light having the predetermined wavelength including the ultraviolet light. As illustrated in FIG. 6, in the light source device 23, plural lamp units 49 including plural flashlamps 48 are arrayed in the matrix state. Similarly to the first embodiment, the wavelength of the light ranges from about 300 nm to about 1100 nm, preferably about 300 nm to about 400 nm, more preferably about 300 nm to about 400 nm and about 800 nm to about 1100 nm. In the second embodiment, the case where the light is "ultraviolet light" will be described below. For example, the lamp unit 49 includes the four flashlamps 48 and reflectors 50. The reflector 50 is provided while surrounding the flashlamp 48, a lower surface side of the reflector 50 is opened, and the reflector 50 multiply reflects the light emitted from the flashlamp 48 and equalizes the light to release the light from the opening. A rear end portion of the reflector 50 is formed so as to be able to be detached from a front end portion, which facilitates exchange of the flashlamps 48.

The light source device 23 can move in the X-axis and Y-axis directions in a plane parallel to the upper surface of the stage 21 by a movement unit (not illustrated). The light source device 23 oscillates back and forth and around (X-axis and Y-axis directions) in the plane at a predetermined amplitude during the lighting of the flashlamp 48 such that a region of the surface of the liquid crystal display substrate 27 corresponding to a gap between the adjacent lamp units 49 can evenly be irradiated with the ultraviolet light.

Figure 11:
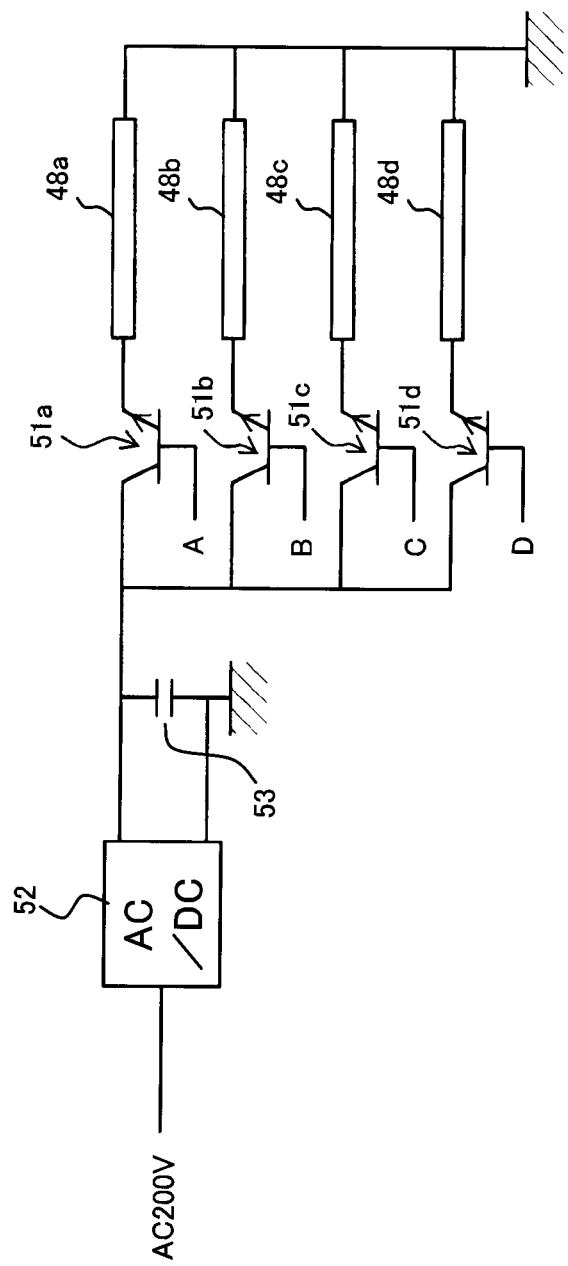
FIG. 11 is an explanatory view illustrating a configuration example of a driving circuit of a light source device used in the producing apparatus of the second embodiment.

A driving circuit illustrated in FIG. 11 is connected to the four flashlamps 48. Switching transistors 51a to 51d are ON/OFF-driven at predetermined time intervals to sequentially light the four flashlamps 48 at a predetermined delay time for a predetermined time.

The lighting of the four flashlamps 48 will be described below with reference to a timing chart of FIG. 12.

When a voltage of AC200 V is supplied, an AC/DC converter 52 of FIG. 11 converts the AC voltage into a DC voltage. Therefore, predetermined charges are accumulated in a capacitor 53 as illustrated in FIG. 12A. Faint current are supplied to the flashlamps 48a to 48d as illustrated in FIG. 12B, and simmer discharge (preliminary lighting) is generated in each of the flashlamps 48a to 48d. In the simmer discharge state, because the flashlamp 48 emits the white light, the flashlamp 48 can be used as the lighting inspection backlight for the liquid crystal display substrate 27. When an A flash pulse illustrated in FIG. 12C is supplied to the switching transistor 51a, the switching transistor 51a is ON-driven to supply the DC voltage to the flashlamp 48a, and the flashlamp 48*a* is lighted only for, for example, Tw=200 μs. Then, as illustrated in FIGS. 12D to 12F, B to D flash pulses are sequentially supplied to the switching transistors 51*b* to 51*d* while delayed by a time of Td. Therefore, the switching transistors 51*b* to 51*d* are sequentially ON/OFF-driven, and the flashlamps 48*b* to 48*d* are sequentially lighted only for, for example, Tw=200 μs. The A to D flash pulses are repeatedly supplied only for the predetermined time to sequentially light the flashlamps 48*a* to 48*d*, thereby obtaining a predetermined irradiation light quantity.

The conveyance unit 24 is provided beside the stage 21. The conveyance unit 24 carries and carries out the liquid crystal display substrate 27 in and from the stage 21. The conveyance unit 24 is a robot including plural arms 54 that suck and retain the surface on the opposite side from the stage 21 of the liquid crystal display substrate 27, that is, an upper surface 31*d* (see FIG. 9) of the counter electrode substrate 31. The conveyance unit 24 proceeds and recedes in the Y-axis direction on a rail 55 illustrated in FIG. 7, and a head portion 56 rotates 360 degrees about a rotating axis 57. Plural suckers are formed in the lower surface of each arm 54, and a suction port 58 is formed in the center portion of each of the suckers. As illustrated in FIG. 5, each suction port 58 is connected to a groove 59 formed in the arm 54, and the suction can be performed by another suction pump through a tube (not illustrated) connected to a hole 60 (see FIG. 6) made in a base portion of each arm 54.

The alignment cameras 25 are provided above the stage 21. The alignment camera 25 detects an alignment mark provided in the liquid crystal display substrate 27 to achieve the alignment between the electrodes 32 of the liquid crystal display substrate 27 and the terminals 47 of the prober 22. The alignment camera 25 and the prober retaining portion 64 concurrently move in the X-axis and Y-axis directions while the alignment camera 25 is fixed to the prober retaining portion 64, and the alignment camera 25 turns about the center of the prober retaining portion 64.

An air knife 26 is provided on the carry-in and carry-out side of the liquid crystal display substrate 27 of the stage 21. The air knife 26 injects compressed air to one surface of the liquid crystal display substrate 27, that is, the rear surface 30*a* (see FIG. 6) of the TFT substrate 30 to blow out the adhering cooling water, thereby rapidly drying the rear surface 30*a* of the TFT substrate 30. The air knife 26 is connected to an air compressor (not illustrated) through piping. The injecting gas is not limited to the air, but nitrogen or inert gas such as argon may be used as the injecting gas.

Figure 13:
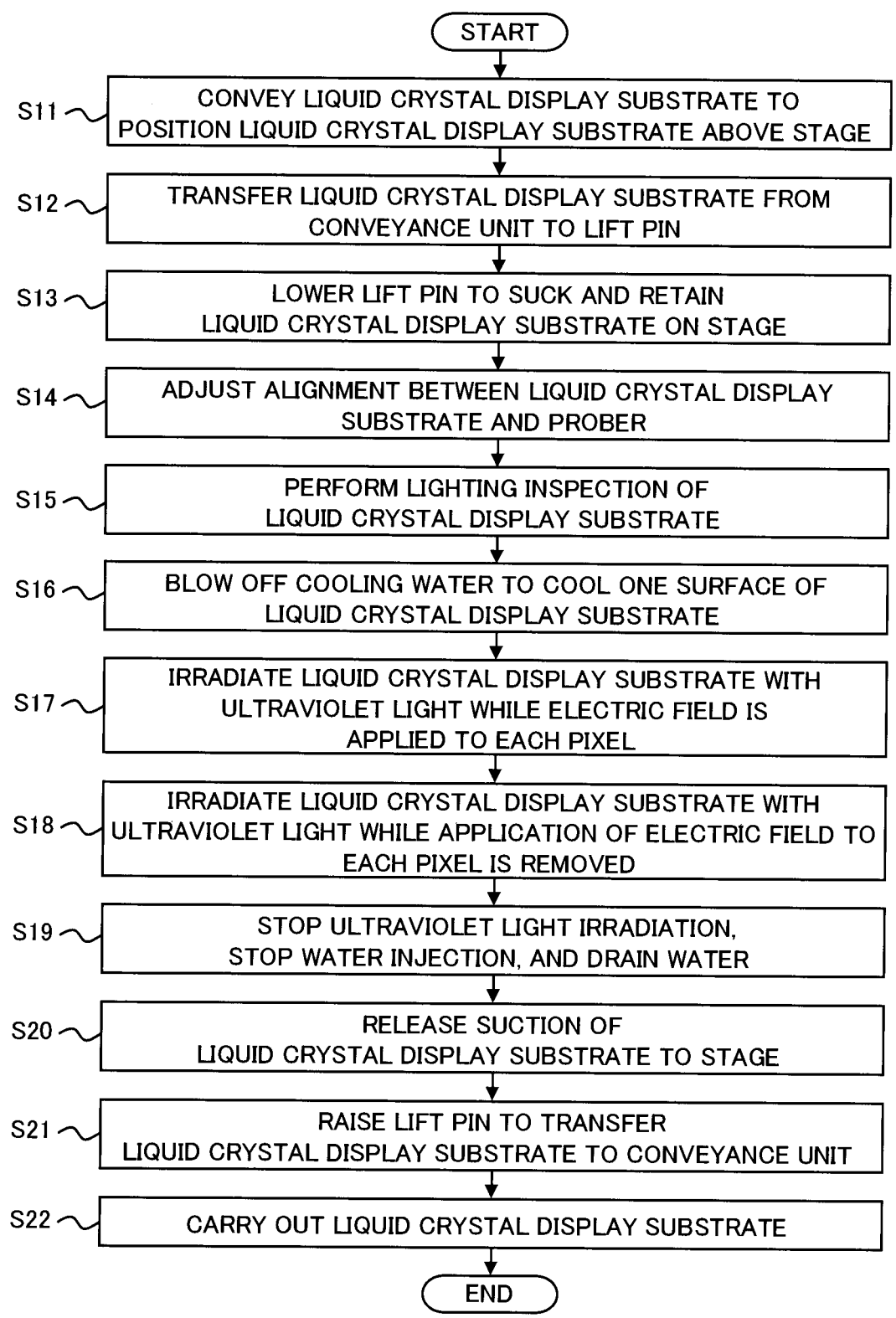
FIG. 13 is a flowchart illustrating a liquid crystal display device producing method using the producing apparatus of the second embodiment.

An operation of the liquid crystal display device producing apparatus of the second embodiment having the above-described configuration and a liquid crystal display device producing method will be described below with reference to a flowchart of FIG. 13.

In Step S11, the conveyance unit 24 conveys the liquid crystal display substrate 27 in the Y-axis direction while the upper surface 31*d* of the counter electrode substrate 31 is sucked to the lower surface of the arm 54 of the conveyance unit 24, thereby positioning the liquid crystal display substrate 27 on the stage 21.

In Step S12, the lift pins 43 are raised to strike leading ends of the lift pins 43 on the rear surface 30*a* of the TFT substrate 30 of the liquid crystal display substrate 27. When a sensor (not illustrated) detects that the leading ends of the lift pins 43 abut on the liquid crystal display substrate 27, the suction of the liquid crystal display substrate 27 to the arms 54 of the conveyance unit 24 is released. Therefore, the liquid crystal display substrate 27 is transferred from the conveyance unit 24 to the lift pins 43. When the transfer of the liquid crystal display substrate 27 is ended, the conveyance unit 24 moves in the Y-axis direction to retreat to the original position.

In Step S13, as illustrated in FIG. 10, the lift pins 43 are lowered in the Z-axis direction to place the liquid crystal display substrate 27 on the stage 21. When a sensor (not illustrated) detects that the liquid crystal display substrate 27 is placed on the stage 21, a controller drives the air compressor (not illustrated) while switching the change-over valve onto the air compressor side, and the air is blown off from the suction and blowoff ports 38 in the upper surface of the sidewall portion 37 of the recessed portion 36 to float the liquid crystal display substrate 27. At this point, the pressing pins (not illustrated) press the liquid crystal display substrate 27 in the diagonal direction against the positioning projections (not illustrated) provided in the two adjacent edge portions of the stage 21. Therefore, the liquid crystal display substrate 27 is disposed in a predetermined position on the stage 21 to coarsely adjust the alignment between the electrodes 32 of the liquid crystal display substrate 27 and the terminals 47 of the probers 22. Then the change-over valve is switched onto the suction pump side, and the liquid crystal display substrate 27 is vacuumed in from the suction and blowoff ports 38 to suck and retain the liquid crystal display substrate 27 to and in the upper surface of the sidewall portion 37 of the recessed portion 36. At this point, the terminals 47 of the probers 22 provided on the prober retaining portion 64 are pushed down by the liquid crystal display substrate 27, and the terminals 47 are brought into press-contact with the electrodes 32 provided in the edge portion of the counter electrode substrate 31 of the liquid crystal display substrate 27.

Figure 14A:
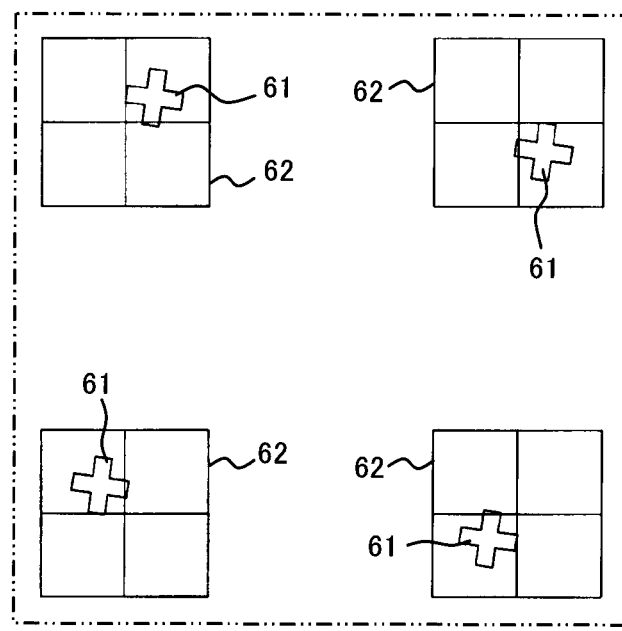
FIGS. 14A and 14B are explanatory views illustrating alignment of the liquid crystal display substrate and a prober using an alignment camera.
Figure 14B:
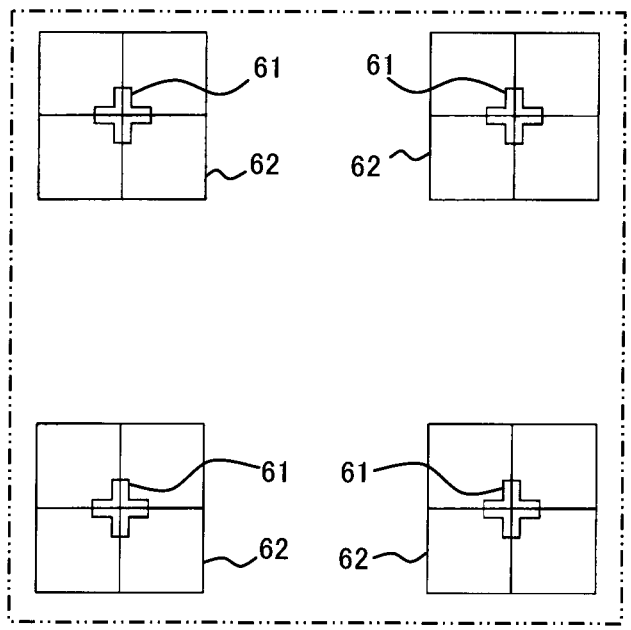

In Step S14, the alignment cameras 25 are ON-driven to take the images of the alignment marks 61 provided in the four corner portions of the liquid crystal display substrate 27. When the alignment marks 61 deviate from the centers of the visual fields 62 of the alignment cameras 25 as illustrated in FIG. 14A, the controller (not illustrated) computes deviation amounts of the alignment marks 61 from the centers of the visual fields 62 of the alignment cameras 25, that is, deviation amounts in the X-axis and Y-axis directions and rotation angles based on the taken images of the alignment mark 61, the prober retaining portion 64 moves in the X-axis and Y-axis directions and rotates according to the deviation amounts and the rotation angles, and the alignment marks 61 are positioned in the centers of the visual fields 62 of the alignment cameras 25 as illustrated in FIG. 14B. Therefore, the terminals 47 of the probers 22 are correctly aligned with the electrodes 32 of the liquid crystal display substrate 27.

In Step S15, the light source device 23 is driven. First the faint currents are supplied to the flashlamps 48*a* to 48*d* of the lamp units 49 to generate the simmer discharge in the flashlamps 48*a* to 48*d*. Accordingly, each of the flashlamps 48*a* to 48*d* emits the white light. At the same time, the current is passed from a signal source (not illustrated) through the prober 22 to the electrodes 32 of the liquid crystal display substrate 27, the predetermined electric field is applied to the pixels 28 to ON-drive the pixels 28, which allows the white light to be transmitted through the liquid crystal display substrate 27. The photosensors 42 provided in the bottom surface in the recessed portion 36 of the stage 21 detect the transmitted light to confirm the lighting state of the liquid crystal display substrate 27.

In Step S16, when the whole lighting of the liquid crystal display substrate 27 is confirmed, the feed-water pump is driven to pipe up the cooling water from the water storage tank, the cooling water is blown off from the blowoff ports 39 provided in the bottom surface in the recessed portion 36 of the stage 21, and the cooling water is sprayed to the rear surface 30a of the TFT substrate 30 of the liquid crystal display substrate 27. Then, the cooling water is drained from the drain port through the drain groove 40, returned to the water storage tank, and cooled to a predetermined temperature (for example, about 24° C.) by the separately provided chiller, whereby the cooling water is circularly used.

In Step S17, while the predetermined electric field is applied to each pixel 28, the A to D flash pulses illustrated in FIGS. 12C to 12F are sequentially supplied to the switching transistors 51a to 51d illustrated in FIG. 11 at a delay time Td to sequentially light the flashlamps 48a to 48d only for a time Tw. The A to D flash pulses are repeatedly supplied for a predetermined time until a predetermined irradiation light quantity is obtained. Accordingly, a large amount of irradiation energy is not intensively supplied unlike the case where the flashlamps 48a to 48d are simultaneously lighted, but the irradiation energy can be dispersed to further suppress the heat generation of the liquid crystal. In performing the process in Step S17, the light source device 23 oscillates in the X-axis and Y-axis directions at a predetermined amplitude such that the region of the liquid crystal display substrate 27 corresponding to the gap between the adjacent lamp units 49 can evenly be irradiated with the ultraviolet light. Therefore, the liquid crystal molecules in the display region 29 of the liquid crystal display substrate 27 can evenly be oriented toward a predetermined direction.

In Step S18, similarly to the process in Step S17, the liquid crystal display substrate 27 is irradiated with the ultraviolet light having the predetermined light quantity while the application of the electric field to each pixel 28 is removed. Therefore, the orientation of the liquid crystal molecules of each pixel 28 is fixed, and the liquid crystal molecules are prevented from returning to the initial state after the electric field applied to each pixel 28 is removed, which allows the orientation of the liquid crystal molecules to be stabilized.

In Step S19, while the light source device 23 is OFF-driven, the feed-water pump is stopped to drain the cooling water in the recessed portion 36 of the stage 21.

In Step S20, the conveyance unit 24 moves in the Y-axis direction to position the arms 54 above the stage 21. Then the suction pump of the stage 21 is stopped to release the suction of the liquid crystal display substrate 27 to the upper surface of the sidewall portion 37 of the recessed portion 36.

In Step S21, the air compressor is driven while the changeover valve is switched, and the air is blown off from the suction and blowoff ports 38 to float the liquid crystal display substrate 27. Then the lift pins 43 are raised, and the liquid crystal display substrate 27 is lifted until the upper surface 31d of the counter electrode substrate 31 abuts on the lower surfaces of the arms 54. When the sensor detects that the liquid crystal display substrate 27 abuts on the arms 54, the suction pump of the conveyance unit 24 is driven to suck the liquid crystal display substrate 27 to the lower surfaces of the arms 54, and the liquid crystal display substrate 27 is transferred from the lift pin 43 to the conveyance unit 24. When the transfer of the liquid crystal display substrate 27 is ended, the lift pins 43 are lowered to a predetermined position.

In Step S22, conveyance unit 24 moves in the Y-axis direction to carry out the liquid crystal display substrate 27. At this point, the compressed air is injected from the air knife 26 provided on the carry-in and carry-out side of the stage 21, and the cooling water adhering to the rear surface 30a of the TFT substrate 30 of the liquid crystal display substrate 27 is blown off to dry the substrate.

In the second embodiment, the liquid crystal display substrate 27 is irradiated with the ultraviolet light having the predetermined light quantity while the application of the electric field to each pixel 28 is removed in Step S18. However, the invention is not limited to the second embodiment. For example, the process in Step S18 may be eliminated when the stable orientation of the liquid crystal molecules is sufficiently obtained in Step S17.

In the second embodiment, the probers 22 are provided in the frame-shaped prober retaining portions 64 that are provided while being movable and surrounding the stage 21. However, the invention is not limited to the second embodiment. For example, the probers 22 may be provided in at least two adjacent edge portions of the stage 21 while being movable in the X-axis and Y-axis directions or rotatable about the center of the probers 22. At this point, the alignment camera 25 may be provided so as to be able to observe both the electrodes 32 of the liquid crystal display substrate 27 and the leading end portions of the terminals 47 of the probers 22. Alternatively, the probers 22 may be fixed to the edge portion of the stage 21 when the electrodes 32 of the liquid crystal display substrate 27 and the terminals 47 of the probers 22 may be aligned within a predetermined allowable range in Step S13. In such cases, the process in Step S14 can be removed to eliminate the alignment camera 25.

In the second embodiment, the electrodes 32 of the liquid crystal display substrate 27 are provided on the side of the counter electrode substrate 31. However, the invention is not limited to the second embodiment. For example, the electrodes 32 may be provided on the side of the TFT substrate 30. In such cases, the probers 22 are retreated to the standby position beside the stage 21 when the liquid crystal display substrate 27 is placed on the stage 21, and the probers 22 may move above the electrodes 32 of the liquid crystal display substrate 27 to bring the terminals 47 of the probers 22 into contact with the electrodes 32 from above when the liquid crystal display substrate 27 is placed on the stage 21.

In the second embodiment, the rear surface 30a of the TFT substrate 30 is brought into contact with the cooling water. However, the invention is not limited to the second embodiment. For example, the upper surface 31d of the counter electrode substrate 31 may be brought into contact with the cooling water. In such cases, the light source device 23 is disposed in the bottom surface of the recessed portion 36 of the stage 21, and a water-resistant flashlamp is used as the flashlamp 48.

In the second embodiment, the cooling water is used as the cooling medium. However, the invention is not limited to the second embodiment. For example, the any liquid such as anti-freeze solution may be used as the cooling medium as long as the liquid comes into contact with one surface of the substrate to cool the substrate.

In the first and second embodiments, the TFT substrate 30 has the COA configuration. However, the invention is not limited to the first and second embodiment. For example, the TFT substrate 30 may have any configuration as long as the orientation of the liquid crystal molecules is controlled by the ultraviolet light irradiation.

Figure 15:
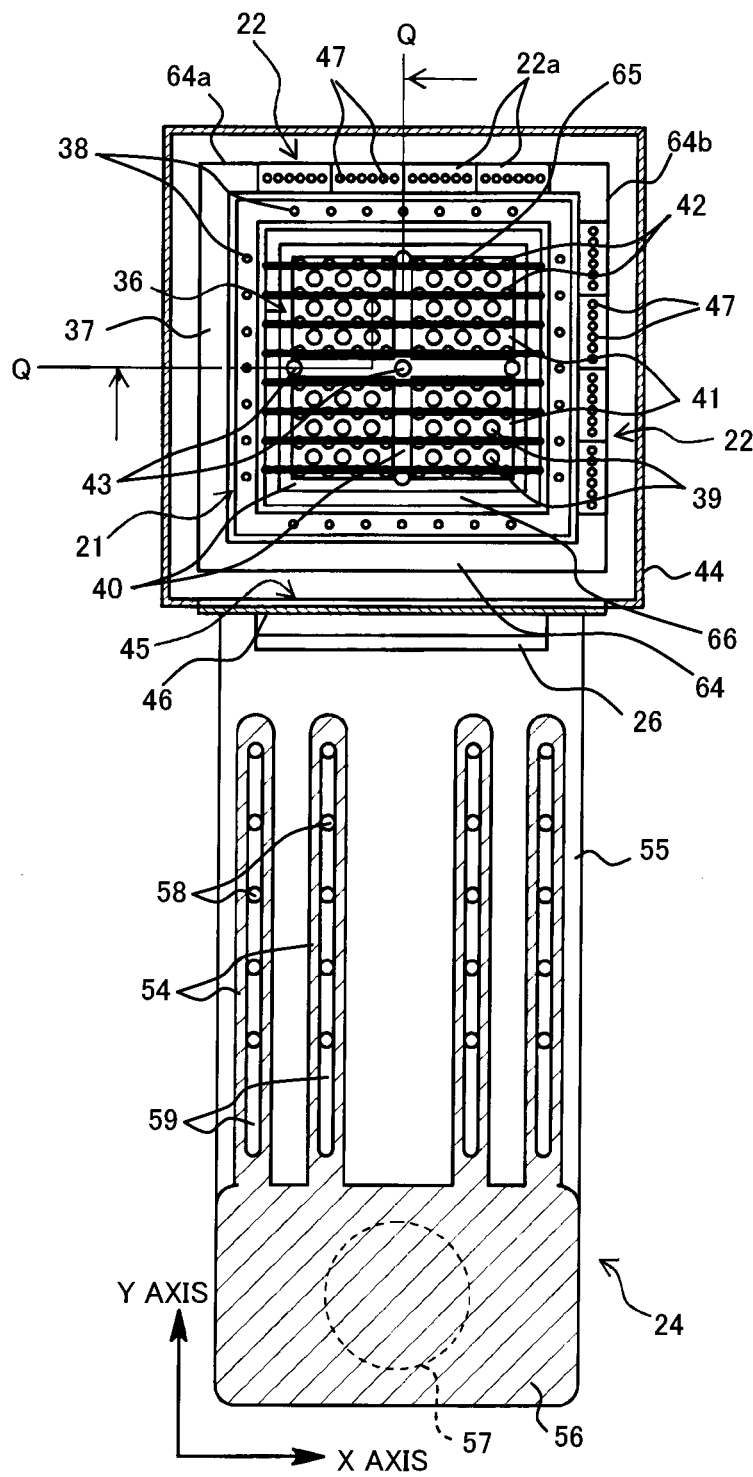
FIG. 15 is a sectional view illustrating a liquid crystal display device producing apparatus according to a third embodiment of the invention.

FIG. 15 is a sectional view illustrating a liquid crystal display device producing apparatus according to a third embodiment of the invention. In the third embodiment, the same elements as the second embodiment are designated by the same numerals, and portions different from those of the second embodiment will be described.

In the third embodiment, plural wires 65 are strung on the opening side of the recessed portion 36 of the second embodiment. The wires 65 support the liquid crystal display substrate 27 from below by abutting on the rear surface 30a of the TFT substrate 30 of the liquid crystal display substrate 27 sucked to and retained by the stage 21. For example, the wires 65 are formed by metal wires or a metal net and strung in the upper end portions of the wire retaining frames 66 that are projected in the recessed portion 36 surrounding the islands 41.

Figure 16:
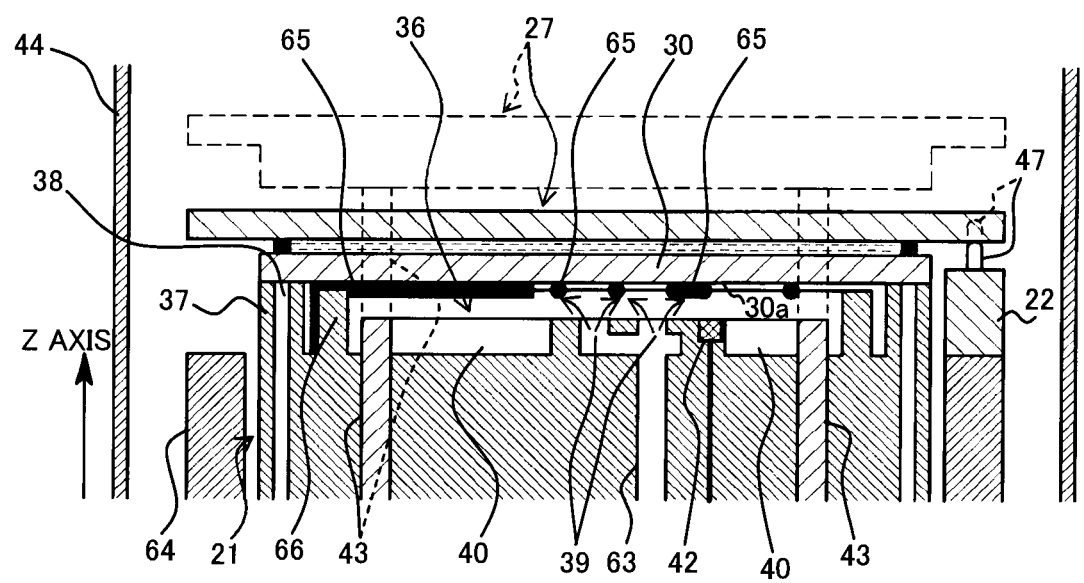
FIG. 16 is a sectional view taken on line Q-Q of FIG. 15.

Therefore, when the liquid crystal display substrate 27 is disposed in a predetermined position on the stage 21, the liquid crystal display substrate 27 is supported from below by the wires 65 strung in the upper end portions of the wire retaining frame 66 on the opening side in the recessed portion 36 as illustrated in FIG. 16. Accordingly, the warp of the liquid crystal display substrate 27 is suppressed.

Figure 17:
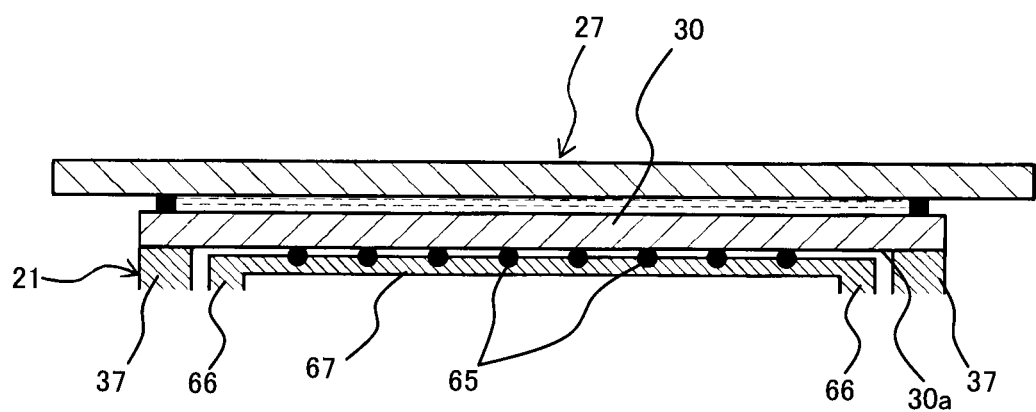
FIG. 17 is a sectional view illustrating a state in which a liquid crystal display substrate placed on a stage of the producing apparatus of the third embodiment is supported by plural wires and a beam portion.

In the third embodiment, the wires 65 are strung on the opening side of the recessed portion 36. However, the invention is not limited to the third embodiment. For example, at least one beam portion 67 may be provided as illustrated in FIG. 17. The beam portion 67 is entrained between opposite sides of the wire retaining frame 66 while intersecting the wires 65, and the beam portion 67 supports the wires 65 from below. Therefore, the flexure of the wire 65 is suppressed to be able to further suppress the warp of the liquid crystal display substrate 27. In such cases, because the wires 65 come into contact with the rear surface 30a of the TFT substrate 30 of the liquid crystal display substrate 27, a line contact between the wires 65 and the rear surface 30a of the TFT substrate 30 is maintained, and cooling efficiency of the liquid crystal display substrate 27 by the cooling water is maintained substantially identical to that of the case where the liquid crystal display substrate 27 is supported only by the wires 65.

Figure 18:
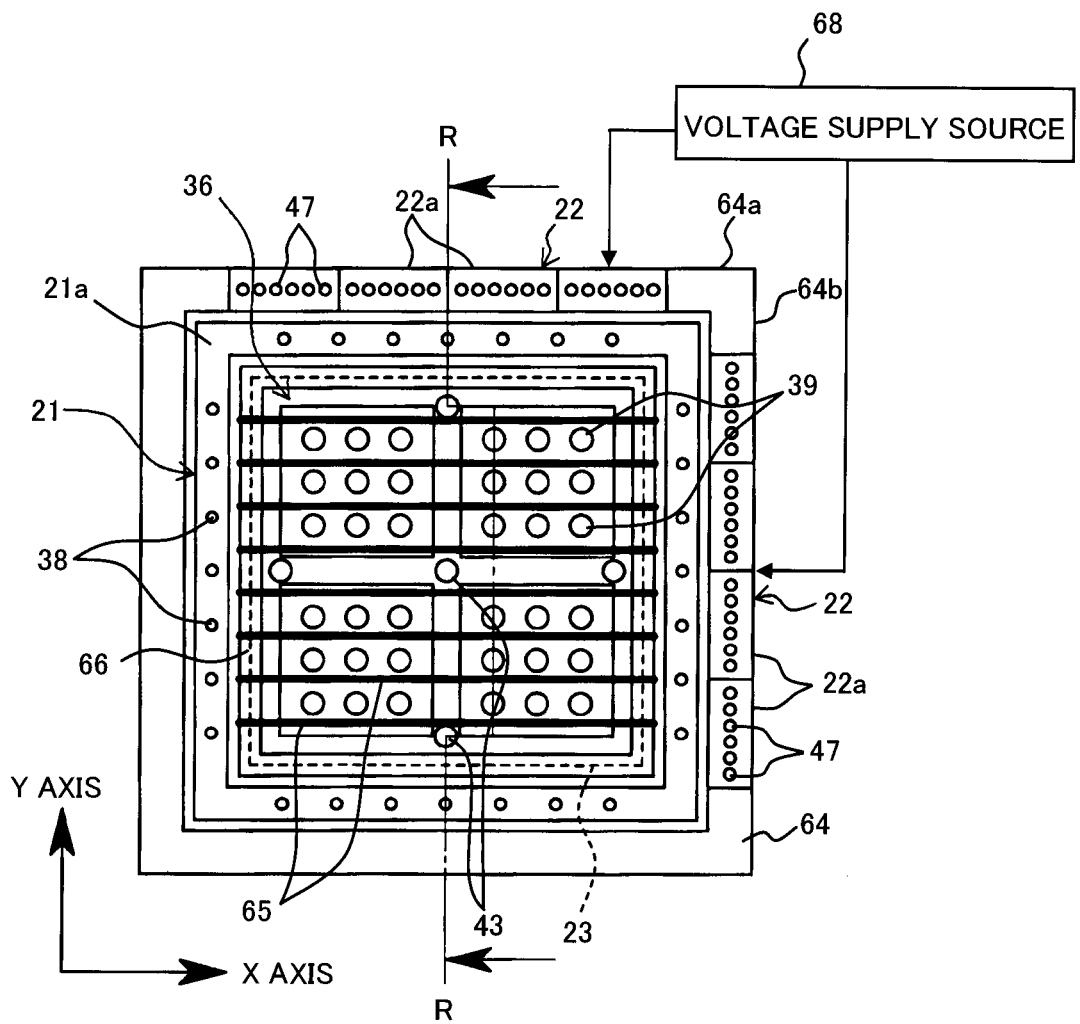
FIG. 18 is a plan view illustrating a schematic configuration of a liquid crystal display device producing apparatus according to a fourth embodiment of the invention.
Figure 19:
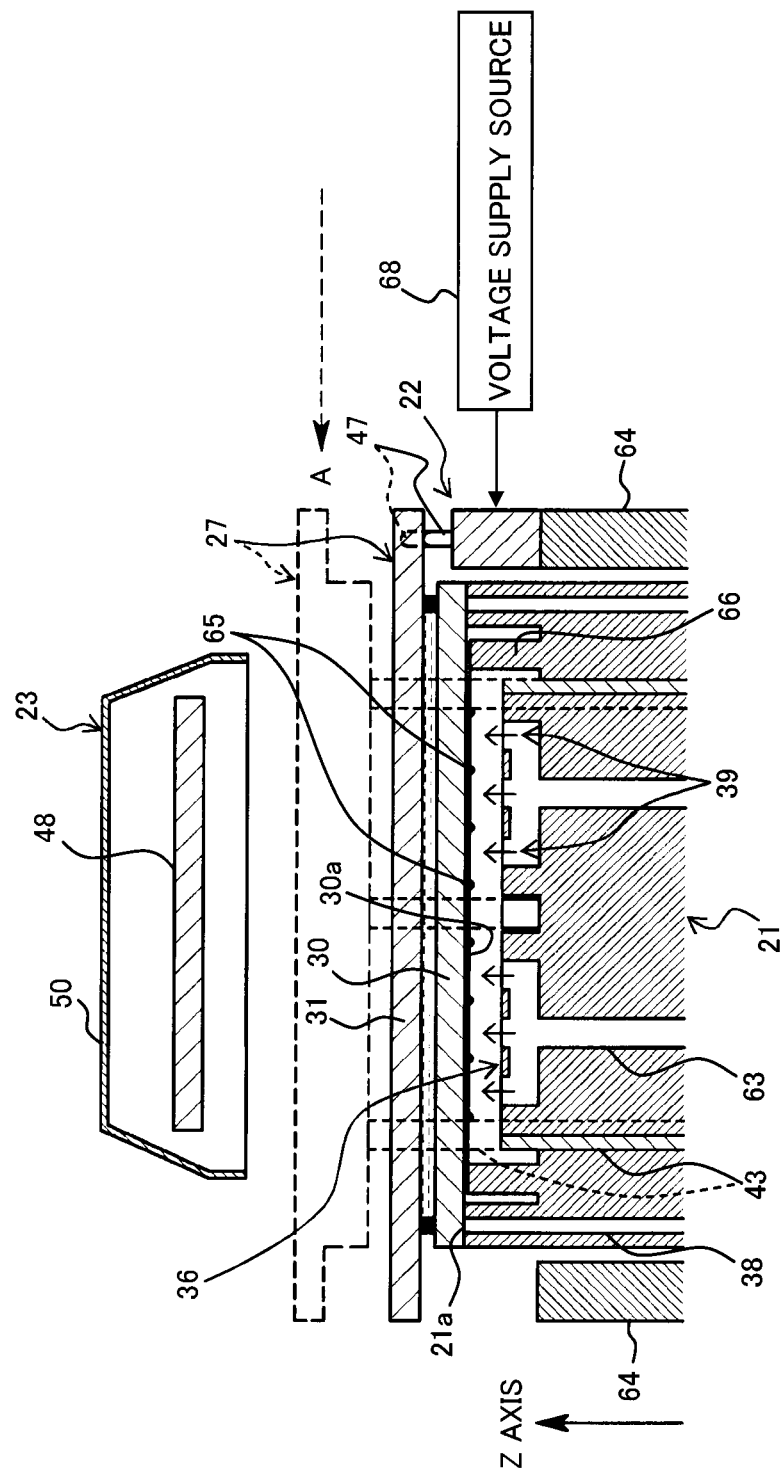
FIG. 19 is a sectional view taken on line R-R of FIG. 18.

FIG. 18 is an enlarged plan view illustrating a main part of a schematic configuration of a liquid crystal display device producing apparatus according to a fourth embodiment of the invention, and FIG. 19 is a sectional view taken on line R-R of FIG. 18. In the fourth embodiment, the same elements as the second and third embodiments are designated by the same numerals, and portions different from those of the second and third embodiments will be described.

The liquid crystal display device producing apparatus of the fourth embodiment includes a voltage supply source 68. The voltage supply source 68 supplies the voltage to the electrodes 32 of the liquid crystal display substrate 27 through the probers 22 in order to apply the electric field to the pixels 28 of the liquid crystal display substrate 27. The voltage supply source 68 can generate a DC voltage and an AC voltage or a pulse voltage. A voltage value varies at predetermined time intervals in the AC voltage or a pulse voltage.

Figure 20:
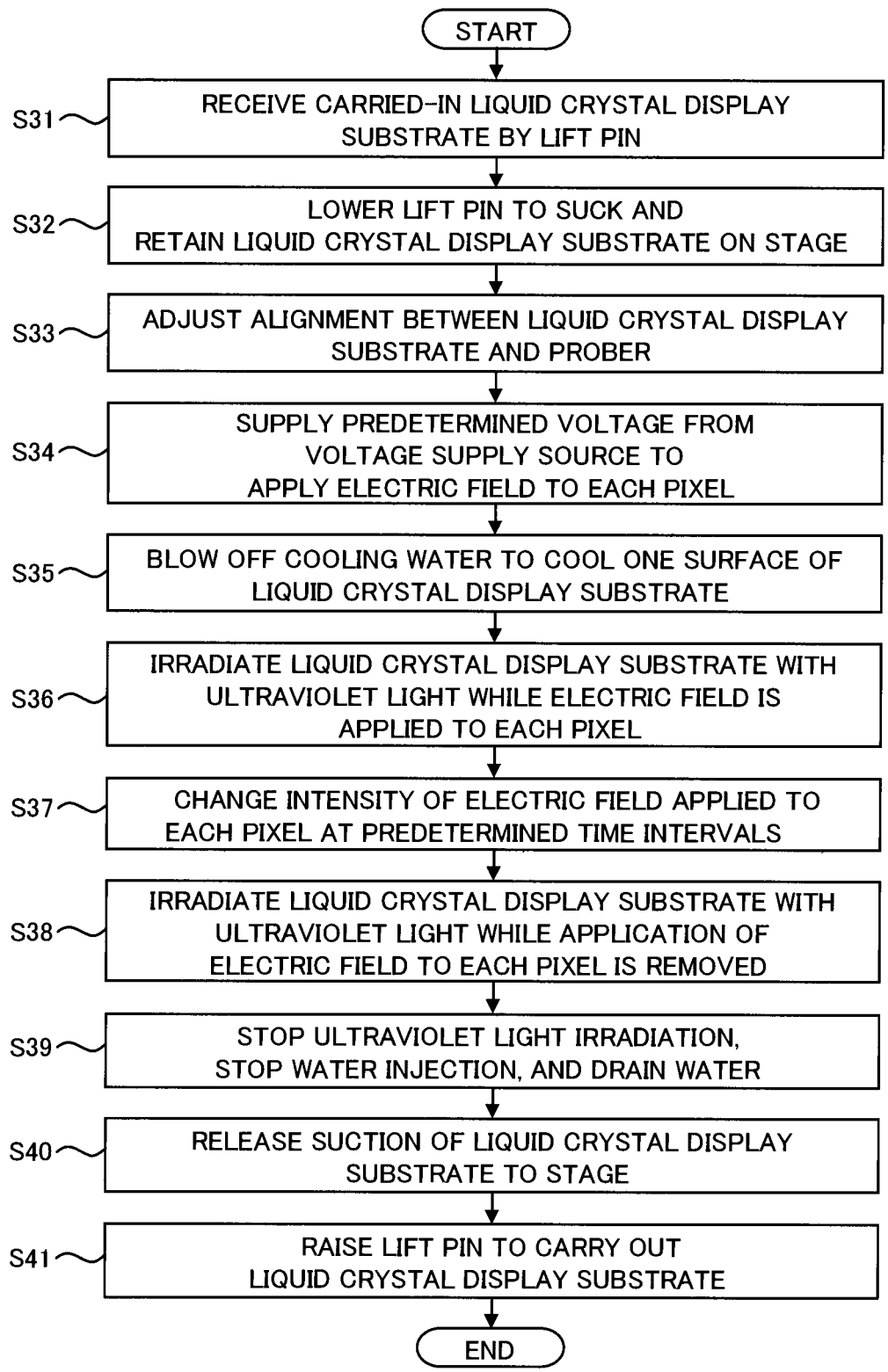
FIG. 20 is a flowchart illustrating a liquid crystal display device producing method using the producing apparatus of the fourth embodiment.

An operation of the liquid crystal display device producing apparatus of the fourth embodiment having the above-described configuration and a liquid crystal display device producing method will be described below with reference to a flowchart of FIG. 20.

In Step S31, as indicated by a broken line of FIG. 19, the lift pins 43 are raised, and the liquid crystal display substrate 27 carried in from the outside in the direction of the arrow A is received by the leasing ends of the lift pins 43.

In Step S32, as indicated by a solid line of FIG. 19, the lift pins 43 are lowered in the Z-axis direction to place the liquid crystal display substrate 27 on the stage 21. At this point, the lift pins 43 are further lowered and separated from the rear surface 30a of the TFT substrate 30 of the liquid crystal display substrate 27. When the sensor (not illustrated) detects that the liquid crystal display substrate 27 is placed on the stage 21, the controller (not illustrated) drives the air compressor (not illustrated) while switching the path change-over valve onto the air compressor side, and the air is blown out from the suction and blowoff ports 38 in the upper surface 21a of the stage 21 to float the liquid crystal display substrate 27. At this point, the pressing pins (not illustrated) press the liquid crystal display substrate 27 in the diagonal direction against the positioning projections (not illustrated) provided in the two adjacent edge portions of the stage 21. Therefore, the liquid crystal display substrate 27 is disposed in a predetermined position on the stage 21 to coarsely adjust the alignment between the electrodes 32 of the liquid crystal display substrate 27 and the terminals 47 of the probers 22. Then the change-over valve is switched onto the suction pump side, and the liquid crystal display substrate 27 is vacuumed in from the suction and blowoff ports 38 to suck and retain the liquid crystal display substrate 27 to and in the upper surface 21a of the stage 21. At this point, the terminals 47 of the probers 22 provided on the prober retaining portion 64 are pushed down by the liquid crystal display substrate 27, and the terminals 47 are brought into press-contact with the electrodes 32 provided in the edge portion of the counter electrode substrate 31 of the liquid crystal display substrate 27. The rear surface 30a of the TFT substrate 30 is supported from below by the wires 65 strung in the upper end portions of the wire retaining frame 66 on the opening side of the recessed portion 36, thereby suppressing the warp of the liquid crystal display substrate 27.

In Step S33, the alignment cameras (not illustrated) take the images of the alignment marks provided in the four corner portions of the liquid crystal display substrate 27, and the prober retaining portions 64 move in the X-axis and Y-axis directions and rotates to perform the alignment such that the alignment marks are matched with the centers of the visual fields of the alignment cameras.

Figure 21A:
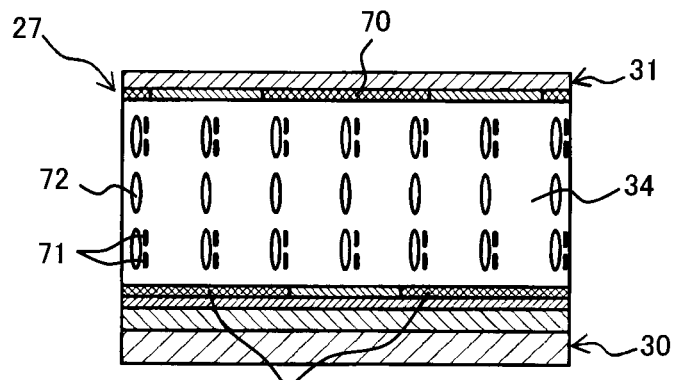
FIGS. 21A to 21D are explanatory views schematically illustrating a state of a liquid crystal orientation obtained by the liquid crystal display device producing method of FIG. 20.
Figure 21B:
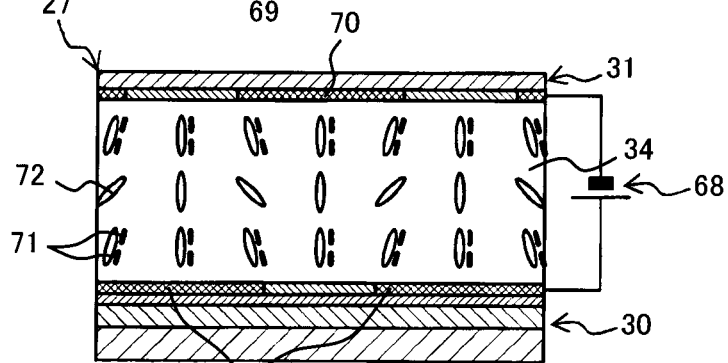

In Step S34, the voltage supply source 68 supplies a predetermined voltage to the electrodes 32 of the liquid crystal display substrate 27 through the probers 22. Therefore, as illustrated in FIG. 21B, the voltage is applied between a pixel electrode 69 of the TFT substrate 30 and a counter electrode 70 of the counter electrode substrate 31, and the predetermined electric field is applied to the pixels 28. At this point, monomers 71 mixed in the liquid crystal material at a constant ratio act similarly to liquid crystal molecules 72 as illustrated in FIG. 21A, and the monomers 71 are oriented toward the same direction as the oriented direction of the liquid crystal molecules 72 as illustrated in FIG. 21B.

In Step S35, the feed-water pump is driven to pipe up the cooling water from the water storage tank, the cooling water is blown off in the arrow direction of FIG. 19 from the blowoff ports 39 provided in the bottom surface in the recessed portion 36 of the stage 21, and the cooling water is sprayed to the rear surface 30a of the TFT substrate 30 of the liquid crystal display substrate 27. At this point, because the wires 65 and the rear surface 30a of the TFT substrate 30 of the liquid crystal display substrate 27 are in line contact with each other, the cooling water sprayed to the rear surface 30a of the TFT substrate 30 strikes evenly on the substantially whole surface in the portion facing the recessed portion 36 of the TFT substrate 30, thereby efficiently cooling the liquid crystal display substrate 27. Then, the cooling water is drained from the drain port through the drain groove, returned to the water storage tank, and cooled to a predetermined temperature (for example, about 24° C.) by the separately provided chiller, whereby the cooling water is circularly used.

Figure 21C:
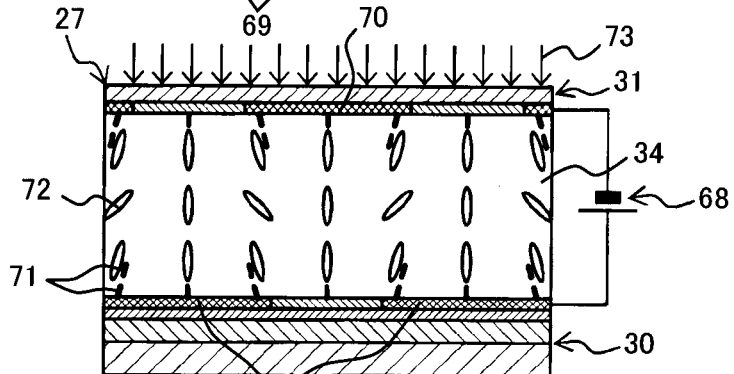

In Step S36, as illustrated in FIG. 21C, while the predetermined electric field is applied to each pixel 28, the light source device 23 is ON-driven to light the flashlamps 48 to irradiate the liquid crystal display substrate 27 with the ultraviolet light 73 having the predetermined light quantity. Therefore, the monomers 71 bridge therebetween to form the polymer, and the polymers grow in the inside surface of the liquid crystal display substrate 27 to form an oriented layer having a polymer structure. In such cases, because a diffusion rate of the monomer 71 is kept constant in the liquid crystal layer 34, a reaction rate to the polymer structure depends on the diffusion rate. That is, a time until the polymer structure is formed in the surface layer inside the substrate surface since the monomers 71 in the liquid crystal layer 34 of the liquid crystal display substrate 27 diffuse in a thickness direction to reach the substrate surface depends on the diffusion rate of the monomer 71.

In the fourth embodiment, in Step S37, when a predetermined time elapses in the irradiation of the ultraviolet light 73, intensity of the electric field applied to each pixel 28 is changed in an alternating-current or pulsating manner at predetermined time intervals while the irradiation of the ultraviolet light 73 is maintained. Therefore, the liquid crystal molecules 72 and the monomers 71 oscillate together, and the monomers 71 diffuse easily in the thickness direction of the liquid crystal layer 34.

Figure 21D:
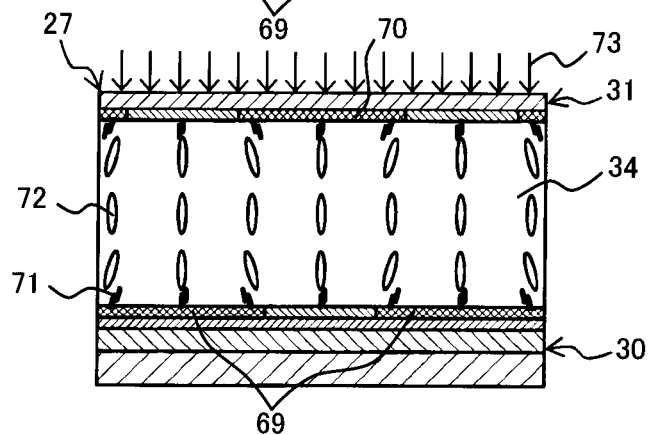

In Step S38, as illustrated in FIG. 21D, the liquid crystal display substrate 27 is irradiated with the ultraviolet light 73 having the predetermined light quantity while the application of the electric field to each pixel 28 is removed. Therefore, the orientation of the liquid crystal molecules 72 of each pixel 28 is fixed, and the liquid crystal molecules 72 of the surface layer are prevented from returning to the initial state even after the electric field applied to each pixel 28 is removed, so that the orientation of the liquid crystal molecules 72 can be stabilized.

In Step S39, while the light source device 23 is OFF-driven, the feed-water pump is stopped to drain the cooling water in the recessed portion 36 of the stage 21.

In Step S40, the suction pump of the stage 21 is stopped to release the suction of the liquid crystal display substrate 27 to the upper surface 21a of the stage 21. Then, the air compressor is driven while the change-over valve is switched, and the air is blown off from the suction and blowoff ports 38 to float the liquid crystal display substrate 27. Then the lift pins 43 are raised to transfer the liquid crystal display substrate 27 to the arms of the conveying robot (not illustrated) (for example, the conveyance unit 24 of the second embodiment), and the liquid crystal display substrate 27 is carried out to the outside. On the other hand, the lift pins 43 are lowered to the predetermined position when the transfer of the liquid crystal display substrate 27 is ended.

In the fourth embodiment, in Step S38, the liquid crystal display substrate 27 is irradiated with the ultraviolet light 73 having the predetermined light quantity while the application of the electric field to each pixel 28 is removed. However, the invention is not limited to the fourth embodiment. For example, the process in Step S38 may be eliminated when the stable orientation of the liquid crystal molecules 72 is sufficiently obtained in Step S37.

In the fourth embodiment, the liquid crystal display substrate 27 is irradiated with the ultraviolet light 73 having the predetermined light quantity while the predetermined electric field is applied to each pixel 28 in Step S36, and the intensity of the electric field applied to each pixel 28 is changed at predetermined time intervals while the irradiation of the ultraviolet light 73 is maintained when the predetermined time elapses in the irradiation of the ultraviolet light 73 by the light source device 23 in Step S37. However, the invention is not limited to the fourth embodiment. For example, as illustrated in FIG. 22A, one period at which the liquid crystal is ON-OFF-ON-driven at predetermined time intervals by the voltage supply source 68 to switch the application of the electric field to each pixel 28 may be repeated predetermined times. In such cases, the plural flashlamps 48 (eight flashlamps in FIG. 22) may sequentially be lighted in an initial ON driving period of the one period at which the liquid crystal is driven. In the sequential lighting of the flashlamps 48, a flashlamp voltage having a pulse width Tw is sequentially supplied to the flashlamps 48 at time intervals Td (see FIG. 22C), and a flashlamp trigger pulse is sequentially supplied to the flashlamps 48 in synchronization with the supply of the flashlamp voltage (see FIG. 22B). The flashlamps 48 are sequentially lighted in the initial ON driving period of the one period at which the liquid crystal is driven, the liquid crystal display substrate 27 is irradiated with the ultraviolet light 73, and the monomers in the substrate surface layer bridge therebetween to form the polymer, thereby forming the oriented layer. Then, the liquid crystal molecules oscillate by switching liquid crystal driving voltage from ON to OFF and from OFF to ON, thereby promoting the diffusion of the unreacted monomers in the thickness direction of the liquid crystal layer 34. The repetition can promote the formation of the oriented layer to shorten the orientation treatment time of the liquid crystal display substrate.

Figure 23:
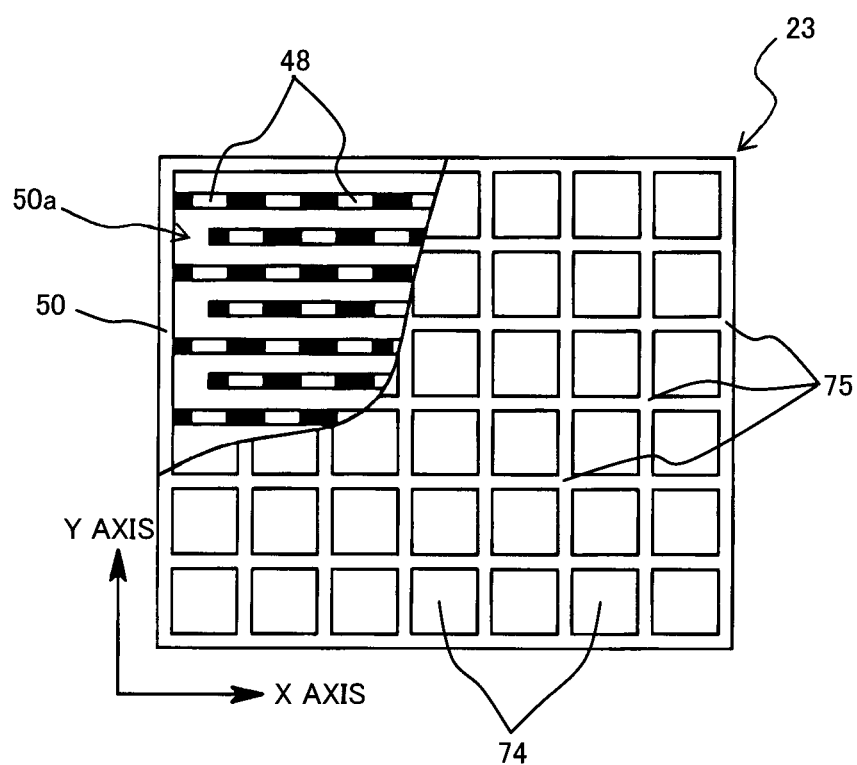
FIG. 23 is an enlarged view illustrating a main part of a liquid crystal display device producing apparatus according to a fifth embodiment of the invention and a partially sectional bottom view illustrating a light source device.

FIG. 23 is an enlarged view illustrating a main part of a liquid crystal display device producing apparatus according to a fifth embodiment of the invention and a partially sectional bottom view illustrating a light source device. In the fifth embodiment, the same elements as the second to fourth embodiments are designated by the same numerals, and portions different from those of the second to fourth embodiments will be described.

As illustrated in FIG. 23, the liquid crystal display device producing apparatus of the fifth embodiment includes the light source device 23 having the plural flashlamps 48 and plural square-shaped filters 74. The flashlamps 48 that emit the ultraviolet light are provided in the reflector 50, and the reflector 50 has the opening 50a having a size corresponding to at least the display region 29 of the liquid crystal display substrate 27 illustrated in FIG. 8. The plural square-shaped filters 74 are horizontally and vertically arrayed on the opening 50a of the reflector 50, and the filter 74 selectively transmits the ultraviolet light having a predetermined wavelength. The whole surface of at least the display region 29 of the liquid crystal display substrate 27 retained by the stage 21 illustrated in FIG. 16 is irradiated with the ultraviolet light. Specifically, the filter 74 cuts off the transmission of the ultraviolet light whose wavelength is about 300 nm or less, and the ultraviolet light whose wavelength is about 300 nm or less damages the liquid crystal. An edge portion of the filter 74 is supported by a support member 75 provided between the filters 74. The light source device 23 lights the flashlamps 48 in each time the light source device 23 moves by one step while horizontally and vertically (X-axis and Y-axis directions) moving a distance of an integral multiple of an array pitch of the filters 74 by predetermined steps. The flashlamp 48 generates the simmer discharge (preliminary lighting) to emit the white light when the faint current is supplied, so that the flashlamp 48 can be used as the lighting inspection backlight of the liquid crystal display substrate 27.

Figure 24:
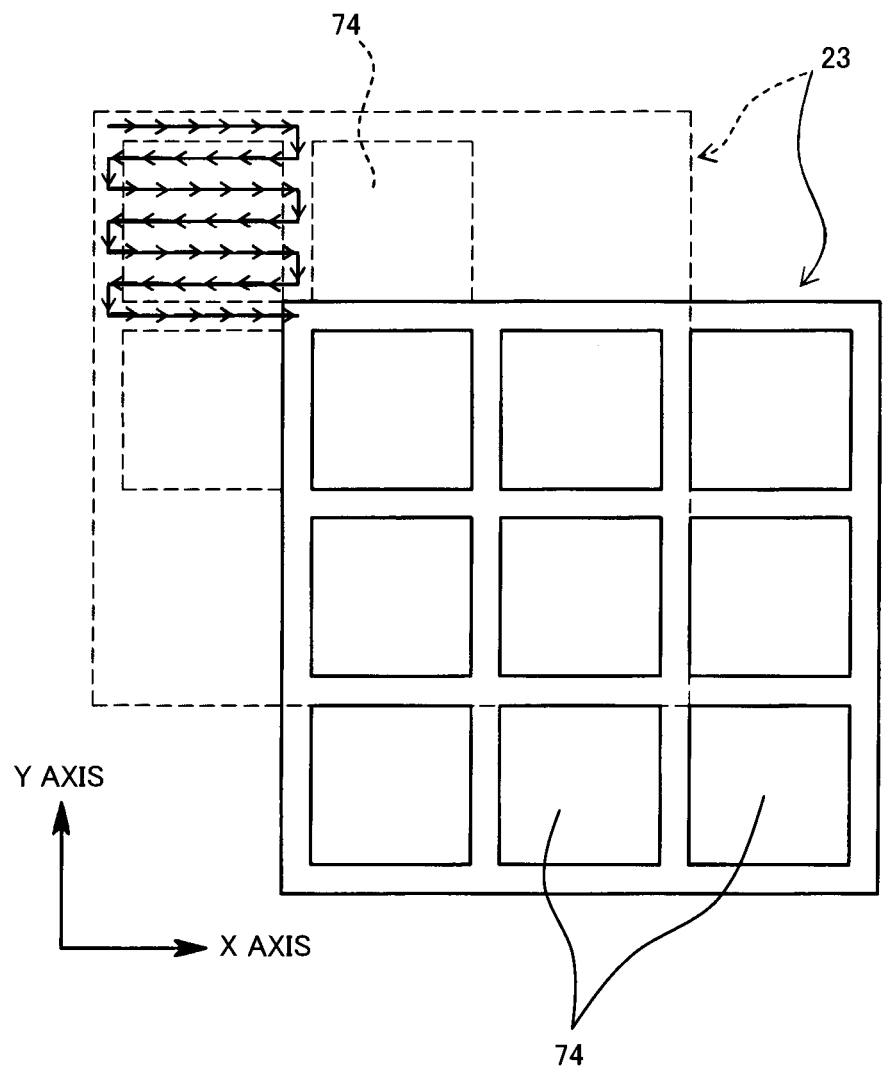
FIG. 24 is an explanatory view illustrating a proper movement example of the light source device of FIG. 23.
Figure 25:
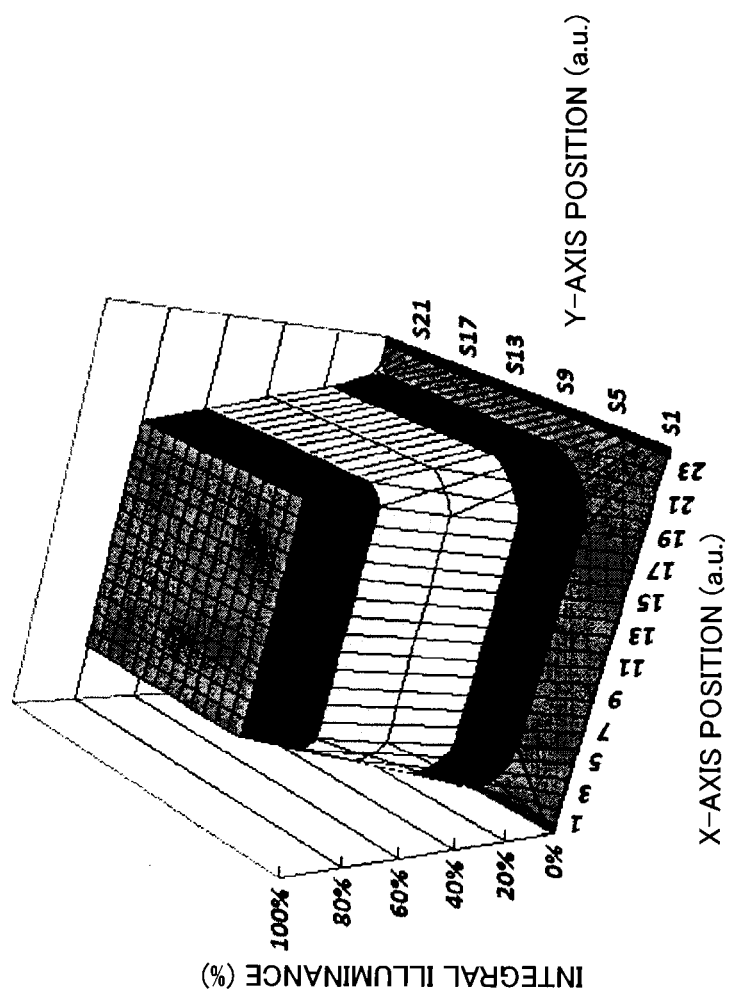
FIG. 25 is an explanatory view illustrating analysis result of an illuminance distribution in the movement of the light source device of FIG. 24.

When the whole surface of at least the display region 29 of the liquid crystal display substrate 27 is irradiated with the ultraviolet light, the light source device 23 moves the distance of the integral multiple of the array pitch of the filters 74 (in FIG. 24, the distance corresponding to the array pitch of the filters 74) by predetermined steps (for example, six steps) in the X-axis and Y-axis directions as illustrated in FIG. 24. Specifically, as illustrated in FIG. 24, the light source device 23 moves by one step from the top toward the bottom along the Y-axis after moving by six steps from the left toward the right along the X-axis, and the light source device 23 moves by one step from the top toward the bottom along the Y-axis after moving by six steps from the right toward the left along the X-axis. Then the light source device 23 moves the distance corresponding to the array pitch of the filters 74 in the zigzag manner by the similar movement to the above-mentioned movement. Then the light source device 23 returns to the original position by following the reverse pathway. At this point, the light source device 23 is controlled to light the flashlamps 48 in each time the light source device 23 moves by one step. Therefore, as illustrated in FIG. 25, the whole surface of the display region 29 of the liquid crystal display substrate 27 can evenly be irradiated with the ultraviolet light to evenly orient the liquid crystal molecules toward a predetermined direction.

Figure 26:
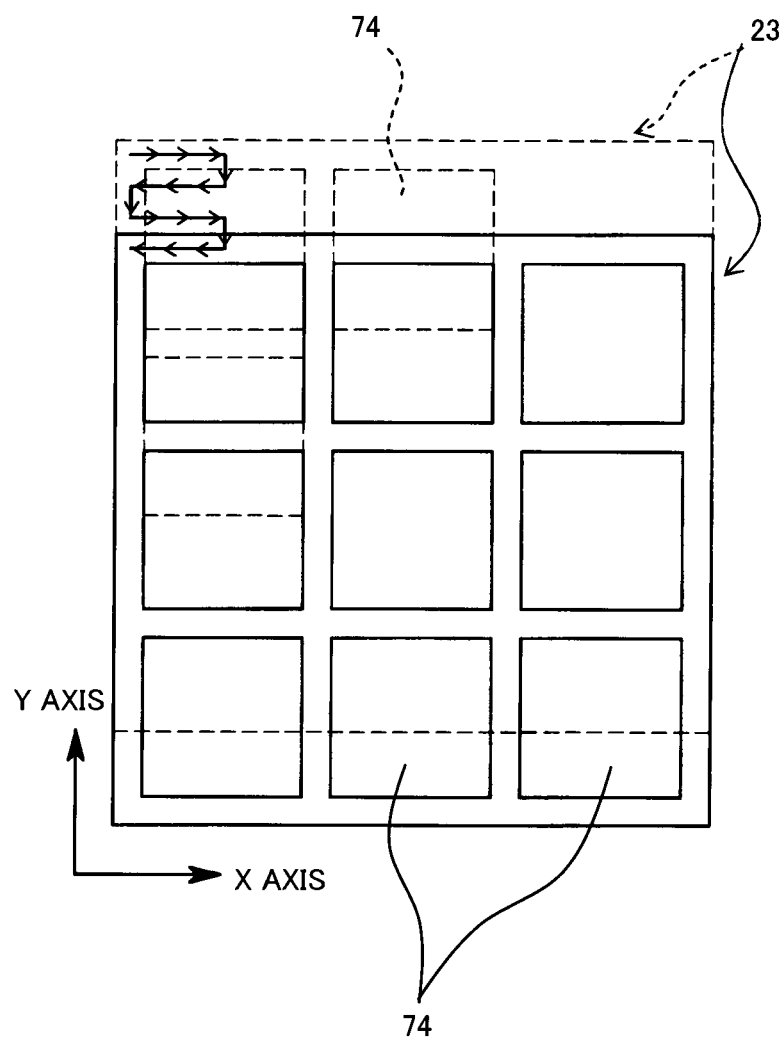
FIG. 26 is an explanatory view illustrating an improper movement example of the light source device of FIG. 23.
Figure 27:
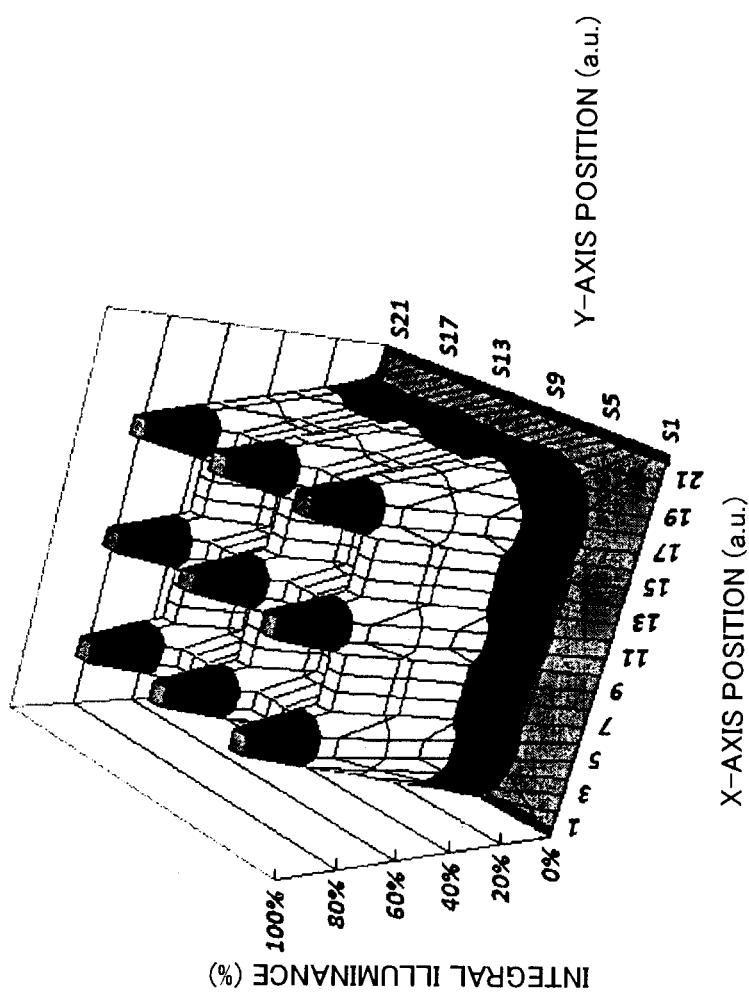
FIG. 27 is an explanatory view illustrating analysis result of an illuminance distribution in the movement of the light source device of FIG. 26.

On the other hand, as illustrated in FIG. 26, when the light source device 23 lights the flashlamps 48 in each time the light source device 23 moves by one step while moving the distance corresponding to a half of the array pitch of the filters 74 by three steps in the X-axis and Y-axis directions, the illuminance distribution illustrated in FIG. 27 is obtained in the display region 29 of the liquid crystal display substrate 27. When the light source device 23 moves the inappropriate distance in the X-axis and Y-axis directions, the illuminance distribution becomes uneven compared with the case of FIG. 25.

In the fifth embodiment, the light source device 23 moves in the zigzag manner. However, the invention is not limited to the fifth embodiment. For example, the light source device 23 may move spirally when the maximum movement amount of the light source device 23 is equal to the integral multiple of the array pitch of the filters 74.

It should be noted that the entire contents of Japanese Patent Applications No. 2008-100089, filed on Apr. 8, 2008, No. 2008-147947, filed on Jun. 5, 2008, No. 2008-257006, filed on Oct. 2, 2008, No. 2008-249682, filed on Sep. 29, 2008, and No. 2008-292999, filed on Nov. 17, 2008 on which the convention priority are claimed are incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A liquid crystal display device producing method for irradiating a liquid crystal display substrate, in which a plurality of pixels are formed in a matrix state and liquid crystal is sealed between a TFT substrate and a counter electrode substrate, with light having a predetermined wavelength to perform an orientation treatment for orienting molecules of the liquid crystal in a display region of the liquid crystal display substrate toward a predetermined direction in a state in which a predetermined electric field is applied to each of the pixels of the liquid crystal display substrate and maintaining the orientation state of the liquid crystal molecules toward the predetermined direction after the electric field applied to each pixel is removed, the method comprising the steps of:
dipping the liquid crystal display substrate and a lamp in a transparent liquid having resistivity of a predetermined value or more and sufficiently high transmittance to the light in a state in which the liquid crystal display substrate and the lamp face each other; and
lighting the lamp to irradiate the liquid crystal display substrate with the light having a predetermined light quantity in a state in which the electric field having a predetermined quantity is applied to each of the pixels.

2. The liquid crystal display device producing method according to claim 1, wherein the liquid is pure water.

3. The liquid crystal display device producing method according to claim 1, further comprising the step of irradiating the liquid crystal display substrate with the light having the predetermined light quantity in a state in which the application of the electric field to each of the pixels is removed after the step of irradiating the liquid crystal display substrate with the light having the predetermined light quantity is performed.

4. A liquid crystal display device producing method for irradiating a liquid crystal display substrate, in which a plurality of pixels are formed in a matrix state and liquid crystal is sealed between a TFT substrate and a counter electrode substrate, with light having a predetermined wavelength to perform an orientation treatment for orienting molecules of the liquid crystal in a display region of the liquid crystal display substrate toward a predetermined direction in a state in which a predetermined electric field is applied to each of the pixels of the liquid crystal display substrate and maintaining the orientation state of the liquid crystal molecules toward the predetermined direction after the electric field applied to each pixel is removed, the method comprising the steps of:
bringing one surface of the liquid crystal display substrate into contact with a liquid cooling medium;
irradiating the liquid crystal display substrate with the light having a predetermined light quantity in a state in which the electric field having a predetermined quantity is applied to each of the pixels; and
irradiating the liquid crystal display substrate with the light having the predetermined light quantity in a state in which the application of the electric field to each of the pixels is removed.

5. The liquid crystal display device producing method according to claim 4, wherein in the step of irradiating the liquid crystal display substrate with the light, the liquid crystal display substrate is irradiated with the light from a side of the counter electrode substrate.

6. The liquid crystal display device producing method according to claim 5, wherein, in the step of bringing one surface of the liquid crystal display substrate into contact with the liquid cooling medium, in the liquid crystal display substrate, a surface of the TFT substrate on a side opposite from the counter electrode substrate is brought into contact with the liquid cooling medium.

7. A liquid crystal display device producing method for irradiating a liquid crystal display substrate, in which a plurality of pixels are formed in a matrix state and liquid crystal is sealed between a TFT substrate and a counter electrode substrate, with light having a predetermined wavelength to perform an orientation treatment for orienting molecules of the liquid crystal in a display region of the liquid crystal display substrate toward a predetermined direction in a state in which a predetermined electric field is applied to each of the pixels of the liquid crystal display substrate and maintaining the orientation state of the liquid crystal molecules toward the predetermined direction after the electric field applied to each pixel is removed, the method comprising the steps of:
bringing one surface of the liquid crystal display substrate into contact with a liquid cooling medium;
irradiating the liquid crystal display substrate with the light having a predetermined light quantity in a state in which the electric field having a predetermined quantity is applied to each of the pixels; and changing intensity of the electric field applied to each of the pixels at predetermined time intervals while the light irradiation is maintained, when a predetermined time elapses in the light irradiation.

8. The liquid crystal display device producing method according to claim 7, further comprising the step of irradiating the liquid crystal display substrate with the light having the predetermined light quantity in a state in which the application of the electric field to each of the pixels is removed after the step of changing the intensity of the electric field applied to each of the pixels at predetermined time intervals is performed.

9. A liquid crystal display device producing method for irradiating a liquid crystal display substrate, in which a plurality of pixels are formed in a matrix state and liquid crystal is sealed between a TFT substrate and a counter electrode substrate, with light having a predetermined wavelength to perform an orientation treatment for orienting molecules of the liquid crystal in a display region of the liquid crystal display substrate toward a predetermined direction in a state in which a predetermined electric field is applied to each of the pixels of the liquid crystal display substrate and maintaining the orientation state of the liquid crystal molecules toward the predetermined direction after the electric field applied to each pixel is removed, the method comprising the steps of:
bringing one surface of the liquid crystal display substrate into contact with a liquid cooling medium; and
performing repeatedly one period, in which the application of the electric field to each of the pixels is ON-OFF-ON-switched, predetermined times to irradiate the liquid crystal display substrate with the light having a predetermined light quantity in an initial ON-time-frame of the one period.

10. The liquid crystal display device producing method according to claim 9, further comprising the step of irradiating the liquid crystal display substrate with the light having the predetermined light quantity in a state in which the application of the electric field to each of the pixels is removed after the step of repeatedly switching the application of the electric field to each of the pixels predetermined times is performed.

11. The liquid crystal display device producing method according to any one of claims 3, 7 and 9, wherein the liquid cooling medium is water cooled to a predetermined temperature.

12. The liquid crystal display device producing method according to any one of claims 1, 3, 7 and 9, wherein the plurality of lamps are arrayed in a plane parallel to a surface of the liquid crystal display substrate.

13. The liquid crystal display device producing method according to any one of claims 1, 3, 7 and 9, wherein the lamp is a flashlamp.

14. The liquid crystal display device producing method according to any one of claims 1, 3, 7 and 9, wherein the TFT substrate has a COA (Color filter On Array) configuration in which color filters are continuously formed in an upper surface thereof.

15. A liquid crystal display device producing apparatus that irradiates a liquid crystal display substrate, in which a plurality of pixels are formed in a matrix state and liquid crystal is sealed between a pair of substrates and a plurality of electrodes for driving the pixels are formed in at least two adjacent edge portions, with light having a predetermined wavelength to perform an orientation treatment for orienting molecules of the liquid crystal in a display region of the liquid crystal display substrate toward a predetermined direction in a state in which a current is passed through each of the electrodes of the liquid crystal display substrate to apply a predetermined electric field to each of the pixels and maintaining the orientation state of the liquid crystal molecules toward the predetermined direction after the electric field applied to each pixel is removed, the liquid crystal display device producing apparatus comprising:
a stage in which a recessed portion for reserving a liquid cooling medium in contact with one surface of the liquid crystal display substrate to cool the liquid crystal display substrate, is formed in a center thereof, and a portion near a peripheral edge in one surface of the liquid crystal display substrate is sucked to an upper surface of a sidewall surrounding the recessed portion to retain the liquid crystal display substrate;
a prober that is disposed near at least two adjacent edge portions of the stage, and provided with a plurality of terminals to which a current is passed by connecting with the plurality of electrodes of the liquid crystal display substrate retained by the stage; and
a light source device that is disposed above the stage to irradiate the liquid crystal display substrate retained by the state with the light.

16. A liquid crystal display device producing apparatus that irradiates a liquid crystal display substrate, in which a plurality of pixels are formed in a matrix state and liquid crystal is sealed between a pair of substrates and a plurality of electrodes for driving the pixels are formed in at least two adjacent edge portions, with light having a predetermined wavelength to perform an orientation treatment for orienting molecules of the liquid crystal in a display region of the liquid crystal display substrate toward a predetermined direction in a state in which a current is passed through each of the electrodes of the liquid crystal display substrate to apply a predetermined electric field to each of the pixels and maintaining the orientation state of the liquid crystal molecules toward the predetermined direction after the electric field applied to each pixel is removed, the liquid crystal display device producing apparatus comprising:
a stage in which a recessed portion for reserving a liquid cooling medium in contact with one surface of the liquid crystal display substrate to cool the liquid crystal display substrate, is formed in a center thereof and a portion near a peripheral edge in one surface of the liquid crystal display substrate is sucked to an upper surface to retain the liquid crystal display substrate;
a plurality of wires that are strung on an opening side of the recessed portion to support the one surface of the liquid crystal display substrate retained by the stage;
a prober that is disposed near at least two adjacent edge portions of the stage, and provided with a plurality of terminals to which a current is passed by connecting with the plurality of electrodes of the liquid crystal display substrate retained by the stage; and
a light source device that is disposed above the stage to irradiate the liquid crystal display substrate retained by the state with the light.

17. The liquid crystal display device producing apparatus according to claim 16, comprising at least one beam portion that is entrained to support the plurality of wires from below while intersecting the plurality of wires.

18. A liquid crystal display device producing apparatus that irradiates a liquid crystal display substrate, in which a plurality of pixels are formed in a matrix state and liquid crystal is sealed between a pair of substrates and a plurality of electrodes for driving the pixels are formed in at least two adjacent edge portions, with light having a predetermined wavelength to perform an orientation treatment for orienting molecules of the liquid crystal in a display region of the liquid crystal display substrate toward a predetermined direction in a state in which a current is passed through each of the electrodes of the liquid crystal display substrate to apply a predetermined electric field to each of the pixels and maintaining the orientation state of the liquid crystal molecules toward the predetermined direction after the electric field applied to each pixel is removed, the liquid crystal display device producing apparatus comprising:

a stage in which a recessed portion for reserving a liquid cooling medium in contact with one surface of the liquid crystal display substrate to cool the liquid crystal display substrate, is formed in a center thereof and a portion near a peripheral edge in one surface of the liquid crystal display substrate is sucked to an upper surface to retain the liquid crystal display substrate;

a prober that is disposed near at least two adjacent edge portions of the stage, and provided with a plurality of terminals to which a current is passed by connecting with the plurality of electrodes of the liquid crystal display substrate retained by the stage;

a voltage supply source that supplies a voltage through the prober to apply the electric field to each of the pixels of the liquid crystal display substrate; and a light source device that is disposed above the stage to irradiate the liquid crystal display substrate retained by the state with the light, wherein intensity of the electric field applied to each of the pixels is changed at predetermined time intervals by the voltage supply source, when a predetermined time elapses in the irradiation of the liquid crystal display substrate with the light by the light source device in a state in which the electric field is applied to each of the pixels, or one period, in which the application of the electric field to each of the pixels is ON-OFF-ON-switched, is repeatedly performed predetermined times to irradiate the liquid crystal display substrate with the light having a predetermined light quantity in an initial ON-time-frame of the one period.

19. The liquid crystal display device producing apparatus according to claim 18, wherein a plurality of wires that support the one surface of the liquid crystal display substrate are strung on an opening side in the recessed portion of the stage.

20. The liquid crystal display device producing apparatus according to any one of claims 15, 16 and 18, wherein, in the light source device, a plurality of lamp units including a plurality of flashlamps are disposed in a matrix state.

21. The liquid crystal display device producing apparatus according to claim 20, wherein the light source device is able to move relative to the stage in a plane parallel to the stage.

22. The liquid crystal display device producing apparatus according to claim 20, wherein the light source device generates simmer discharge of the plurality of flashlamps before the light having the predetermined wavelength is lighted.

23. The liquid crystal display device producing apparatus according to claim 22, wherein the plurality of flashlamps are sequentially lighted only for a predetermined time at a predetermined delay time.

24. The liquid crystal display device producing apparatus according to claim 22, further comprising a plurality of photosensors in a bottom surface of the recessed portion of the stage.

25. The liquid crystal display device producing apparatus according to any one of claims 15, 16 and 18, further comprising a blowoff port and a discharge port in the bottom surface of the recessed portion of the stage, the liquid cooling medium being blown off through the blowoff port to spray the liquid cooling medium to one surface of the sucked and retained liquid crystal display substrate, the liquid cooling medium being discharged through the discharge port.

26. The liquid crystal display device producing apparatus according to any one of claims 15, 16 and 18, further comprising a conveyance unit that carries and carries out the liquid crystal display substrate in and from the stage.

27. The liquid crystal display device producing apparatus according to claim 26, wherein the conveyance unit conveys the liquid crystal display substrate while sucking a surface on a side opposite from the stage.

28. The liquid crystal display device producing apparatus according to claim 26, wherein an air knife is provided beside the stage on a carry-in and carry-out side of the liquid crystal display substrate to inject compressed air to one surface of the liquid crystal display substrate to thereby blow off the adhering liquid cooling medium.

29. The liquid crystal display device producing apparatus according to any one of claims 15, 16 and 18, wherein the liquid cooling medium is water cooled to a predetermined temperature.

30. A liquid crystal display device producing apparatus that irradiates a liquid crystal display substrate, in which a plurality of pixels are formed in a matrix state and liquid crystal is sealed between a pair of substrates, with light having a predetermined wavelength to perform an orientation treatment for orienting molecules of the liquid crystal in a display region of the liquid crystal display substrate toward a predetermined direction in a state in which a predetermined electric field is applied to each of the pixels of the liquid crystal display substrate and maintaining the orientation state of the liquid crystal molecules toward the predetermined direction after the electric field applied to each pixel is removed, the liquid crystal display device producing apparatus comprising:

a stage in which a recessed portion for reserving a liquid cooling medium in contact with one surface of the liquid crystal display substrate to cool the liquid crystal display substrate, is formed in a center thereof, and a portion near a peripheral edge in one surface of the liquid crystal display substrate is sucked to an upper surface to retain the liquid crystal display substrate; and a light source device disposed above the stage, in which a plurality of flashlamps that emit the light is provided in a reflector having an opening, the opening having a size corresponding to at least a display region of the liquid crystal display substrate, and a plurality of square-shaped filters is arrayed vertically and horizontally in the opening of the light source device, the filter cutting off transmission of light having a specific wavelength, wherein the light source device lights the plurality of flashlamps in each time the light source device moves by one step while moving vertically and horizontally a distance of an integral multiple of an array pitch of the filters.

31. The liquid crystal display device producing apparatus according to claim 30, wherein the plurality of filters cut off the transmission of the ultraviolet light whose wavelength is about 300 nm or less.

32. The liquid crystal display device producing apparatus according to claim 30 or 31, wherein a support member that supports an edge portion of each filter is provided between the plurality of filters.

33. The liquid crystal display device producing apparatus according to claims 30, wherein the light source device generates simmer discharge of the plurality of flashlamps before the light having the predetermined wavelength is lighted.

* * * * *